United States Patent
Schwarz

[15] 3,663,940
[45] May 16, 1972

[54] CONTROLLABLE, LOAD INSENSITIVE POWER CONVERTERS

[72] Inventor: Franciscc Schwarz, Weston, Mass.

[73] Assignee: The United States of America as represented by the Administrator of the National Aeronautics and Space Administration

[22] Filed: May 21, 1970

[21] Appl. No.: 39,342

[52] U.S. Cl..................321/2, 321/11, 321/18, 321/19, 321/45 R, 321/45 ER
[51] Int. Cl.......................................H02m 3/32
[58] Field of Search.............321/2, 4, 11, 18, 19, 43–45, 321/45 ER

[56] References Cited

UNITED STATES PATENTS

| 3,120,634 | 2/1964 | Genuit | 321/45 |
| 3,439,251 | 4/1969 | Schaefer | 321/2 X |
| 3,319,147 | 5/1967 | Mapham | 321/45 X |
| 3,490,028 | 1/1970 | Modiano | 321/2 |
| 3,487,278 | 12/1969 | Turnbull et al. | 321/45 X |
| 3,413,538 | 11/1968 | Hodges | 321/45 X |
| 3,526,823 | 9/1970 | Genuit | 321/45 X |
| 3,164,767 | 1/1965 | Morgan | 321/45 X |

FOREIGN PATENTS OR APPLICATIONS 230,272  8/1969  U.S.S.R..........................321/45 R

Primary Examiner—William H. Beha, Jr.
Attorney—John R. Manning, J. A. Mackin and N. T. Musial

[57] ABSTRACT

Circuitry for converting DC or AC voltage to a higher or lower DC or AC voltage by directing current alternately through a pair of inductive-capacitive loops. A portion of the inductance of each loop is magnetically coupled to another inductance whose current is rectified and supplied to a load. Voltage sensing circuits are utilized to time the flow of current through the pair of loops. Energy is magnetically coupled from the load circuit to the inductance of the pair of loops to improve starting and overload operating conditions.

18 Claims, 27 Drawing Figures

Patented May 16, 1972

INVENTOR
FRANCISC C. SCHWARZ

BY *Herbert E. Farmer*

ATTORNEY

INVENTOR
FRANCISC C. SCHWARZ

INVENTOR
FRANCISC C. SCHWARZ

INVENTOR
FRANCISC C. SCHWARZ

INVENTOR
FRANCISC C. SCHWARZ

INVENTOR
FRANCISC C. SCHWARZ

INVENTOR
FRANCISC C. SCHWARZ

INVENTOR
FRANCISC C. SCHWARZ

INVENTOR
FRANCISC C. SCHWARZ

INVENTOR
FRANCISC C. SCHWARZ

CONTROLLABLE, LOAD INSENSITIVE POWER CONVERTERS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to power supplies, and more particularly, to power converters. It is first discussed with reference to its application to a DC to DC converter, and then enlarged to other more general applications.

Various systems for transforming the output of a DC voltage source from one level to another level (either up or down) have been proposed and are in use. One common type of system uses a pair of switching transistors in combination with a saturable transformer to invert DC to AC and to an increased or decreased voltage level. The output of the transformer is then rectified to change the AC voltage back to a DC voltage. While systems of this general nature are satisfactory when operated at low voltage levels, they are not satisfactory when operated at input levels in excess of 100V and at power levels in excess of several hundred watts.

Systems of the foregoing general nature have been modified to increase their voltage capacity by utilizing solid state switches such as silicon control rectifiers in place of transistors. However, these systems are still not entirely satisfactory due to the turn off problem inherent in the use of silicon controlled rectifiers. In addition, voltage transients and other effects that occur cause hazards to the operation of these systems. Moreover, these systems, in the past, have been sensitive to voltage source fluctuations and load impedance fluctuations. Therefore, it is an object of this invention to provide new and improved types of solid state electric power converters.

It is another object of this invention to provide a controllable, load insensitive power converter that converts DC or AC voltage from a source from one level to a DC or AC voltage at another level at higher power levels such as kilowatts or beyond. The concept DC or AC are used here in a broad sense and comprise any combination thereof with any frequency component distribution compatible with the physically attainable speed of converter operation.

It is a further object of this invention to provide a controllable, load insensitive power converter or power amplifier that reproduces a low power level control signal at its output terminals at a greater increased power level, including constant signals such as DC levels, sinusoids such as conventional AC waves, or other irregular signals as processed by power amplifiers.

It is yet another object of this invention to provide a controllable, load insensitive power converter or power amplifier that reproduces a low power level control signal at its output at a greater increased power level with high accuracy and high efficiency even though the prime source of electric energy may provide the power with an irregularly fluctuating voltage.

It is a further object of this invention to provide a controllable, load insensitive electric power converter that is dynamically stable over a wide range of source and load voltage fluctuations.

SUMMARY OF THE INVENTION

In accordance with principles of this invention, controllable, load insensitive power converters are provided. The converters basically comprise a primary section and a secondary section. The primary section includes a source of electric energy and a pair of switchable loops for switching current through the primary winding of the transformer. The secondary section basically comprises the secondary winding of the transformer and a diode bridge circuit connected to the secondary winding. If desired, the output from a bridge circuit can be smoothed prior to its application to a load.

In accordance with a further principle of this invention, the switchable loops are switched by solid state switches being alternately turned on and off. Further, capacitors are included in the primary loops of electric energy, directly or through an input network to couple the loops to the source.

In accordance with yet another principle of this invention, sensing and control means are provided to sense the required load voltage and compare it with a reference voltage. The results of the comparison are utilized to control the operation of the solid state switches. Further, inductors may be provided in the secondary section and inductively coupled to inductors in the primary section so as to add energy to the output of the bridge under starting, high input voltage, or overload conditions.

In accordance with still another principle of this invention, a clipping circuit is inductively coupled to the inductor connected in the primary circuit, and connected to the power source so as to clip the voltage in the primary circuit when the voltage of the capacitors exceeds a preset minimum value, thereby preventing detrimental effects from occurring.

It will be appreciated from the foregoing summary of the invention that controllable, load insensitive converters are provided by the invention. These converters are first discussed in the following description of the preferred embodiments of the invention with reference to its application to DC to DC conversion and then enlarged to more general applications. Because the load controls the operation of the switches, increasing of the load current increases the number of working cycles of the system and thus the amount of power converted by the transformer. Hence, load insensitivity is provided. In addition, by the inclusion of additional inductive coupling between the primary and secondary sections, additional power transfer from the source to the load can be provided for conditions under which, otherwise, the capacitors would exceed their voltage rating and that of other associated components. Moreover, the addition of a clipping circuit to the primary section results in the elimination of these undesirable and, potentially, destructive effects.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

The following is a description of preferred embodiments of the invention which, in effect, are series capacitor converters which transform the voltage $e_s(t)$ of a source of unidirectional or bidirectional electric energy flow to another voltage $e_o(t)$ of unidirection or bidirectional energy flow. While the converters are, first, presented in the form of DC-to-DC converters, they are not necessarily restricted to this type of application, as indicated further on in the description.

The invention distinguishes itself from other converters of this general type because of: (1) its ability to implement a voltage scaling operation concurrent with a voltage waveform transformation such as AC to DC conversion, or DC to AC inversion, or signal amplification with simultaneous voltage stabilization, or removal of an input voltage ripple; (2) its intrinsic higher energy density and almost unconditional dynamic stability due to the absence of: (a) the conventional LC output filter, with its associated bulk problems of stability; (b) the need for bulky power transformers that can operate over relatively wide frequency bands; and, (c) the need for substantial dummy loads to permit full load operation; and, (3) its ability to maintain a relatively constant efficiency of operation for wide variations of the input voltage and/or output voltage due to the incorporation of a novel nonlinear, variable frequency LC power oscillator not equalled by other state-of-the-art converters.

Figure 1:
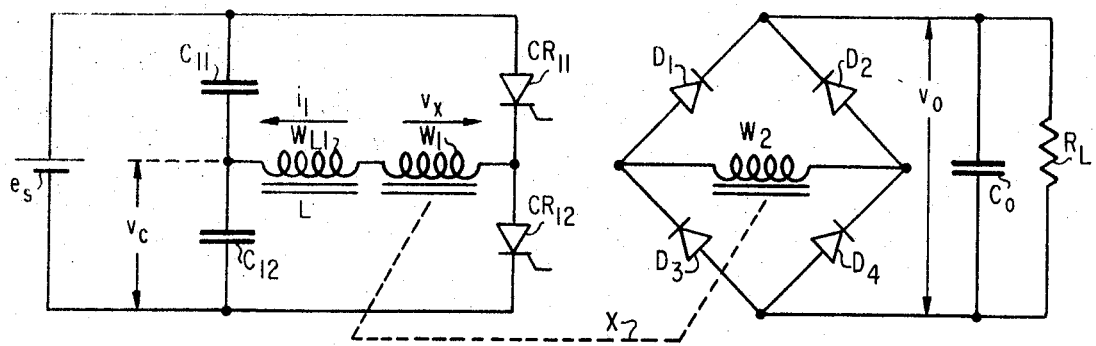
FIG. 1 is a schematic diagram of a controllable load insensitive converter formed in accordance with the invention.

A schematic diagram of a converter formed in accordance with the invention that incorporates the qualities enumerated under (1) and (2) above is illustrated in FIG. 1. Its operation is hereinafter discussed with reference to the associated characteristic voltage and current waveforms illustrated in FIGS. 2 A–D.

The converter illustrated in FIG. 1 comprises: a voltage source designated $e_s$; two capacitors designated $C_{11}$ and $C_{12}$; two silicon controlled rectifiers designated $CR_{11}$ and $CR_{12}$; an inductor designated L with a winding designated $W_{L1}$; a transformer designated X having a primary winding designated $W_1$ and a secondary winding designated $W_2$; four diodes designated $D_1$, $D_2$, $D_3$ and $D_4$; a smoothing capacitor designated $C_o$; and, a load designated $R_L$. For purposes of description, the elements connected to $W_1$ are herein referred to as the primary section and the elements connected to $W_2$ are referred to as the secondary section.

$C_{11}$ and $C_{12}$ are connected in series and across the terminals of the voltage source $e_s$. The junction between $C_{11}$ and the positive terminal of $e_s$ is connected to the anode of $CR_{11}$. The cathode of $CR_{12}$ is connected to the junction between $C_{12}$ and the negative terminal of $e_s$. $W_{L1}$ is connected in series with $W_1$ from the junction between $C_{11}$ and $C_{12}$ to the junction between the cathode of $CR_{11}$ and the anode of $CR_{12}$.

The cathodes of $D_1$ and $D_2$ are connected together as are the anodes of $D_3$ and $D_4$. The cathode of $D_3$ is connected to the anode of $D_1$ and the cathode of $D_4$ is connected to the anode of $D_2$. Hence, $D_1$, $D_2$, $D_3$ and $D_4$ are connected in a bridge configuration. $W_2$ is connected from the junction between $D_1$ and $D_3$ to the junction between $D_2$ and $D_4$ and $C_o$ is connected from the junction between $D_1$ and $D_2$ to the junction between $D_3$ and $D_4$. $R_L$ is connected in parallel with $C_o$.

The power switches of the above described converter, the two silicon controlled rectifiers $CR_{11}$ and $CR_{12}$, conduct current in the following sequence:

$CR_{11}$ is "on" during time intervals $T_k$,
$CR_{12}$ is "on" during time intervals $T_{k+1}$
where:

$$k = 2n + 1$$

and $$n = 0, 1, 2, 3, \ldots$$

Figure 2A:
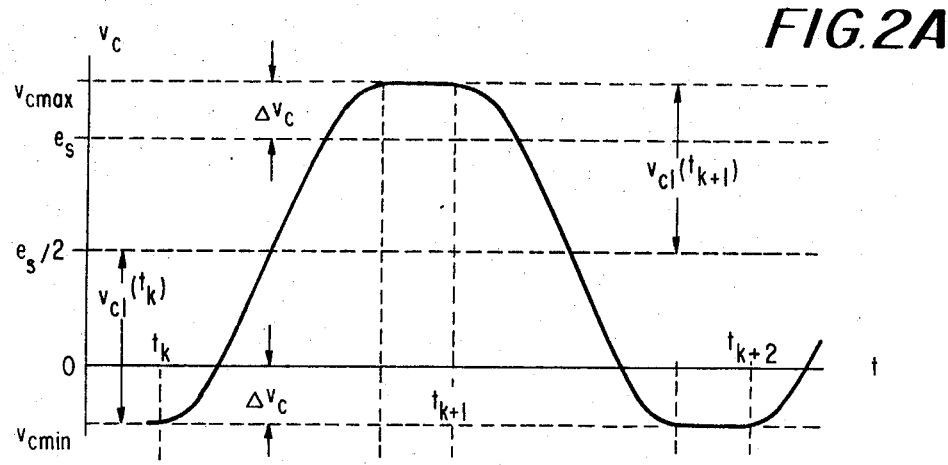
FIGS. 2 A–D are characteristic voltage and current waveforms of the load insensitive controllable converter illustrated in FIG. 1.
Figure 2B:
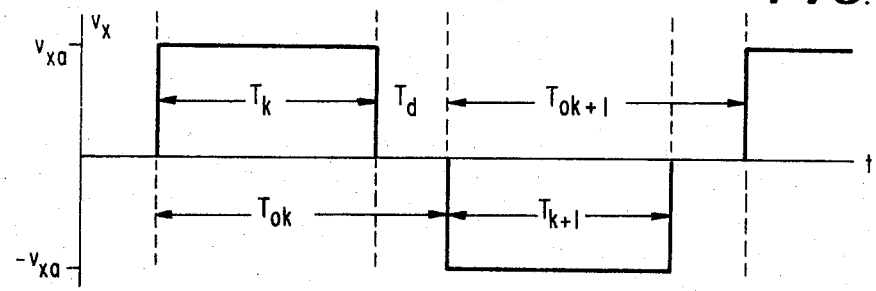

The rectangular voltage waveform $v_x$ that appears across $W_1$ when $CR_{11}$ and $CR_{12}$ conduct in this sequence is illustrated in FIG. 2B. The flat top appears during conduction of $CR_{11}$ or $CR_{12}$. Its average height $v_{xa}$ is determined by the average system output voltage $V_o$, as it appears across the load terminals, and the turns ratio $N_2/N_1$ of $W_2$ to $W_1$. That is:

$$v_{xa} = \frac{1}{T_k} \frac{N_1}{N_2} \int_{t_k}^{t_k+T_k} v_o dt \text{ for } t_k < t < t_k + T_k \quad (1)$$

where $$t_k = \sum_{i=1}^{k-1} T_{oi};$$

and, $T_{ok}$ = the $k$th interval of operation

The same equation holds for $T_{k+1}$ since the previous differentiation between the two succeeding half cycles was merely introduced to clarify the significance of the two controlled rectifiers $CR_{11}$ and $CR_{12}$. Hence, the voltage $v_x$ across $W_1$ appears during each phase of switch conduction as a quasi fixed potential $v_{xa}$ which opposes the source voltage $e_s$.

Figure 3:
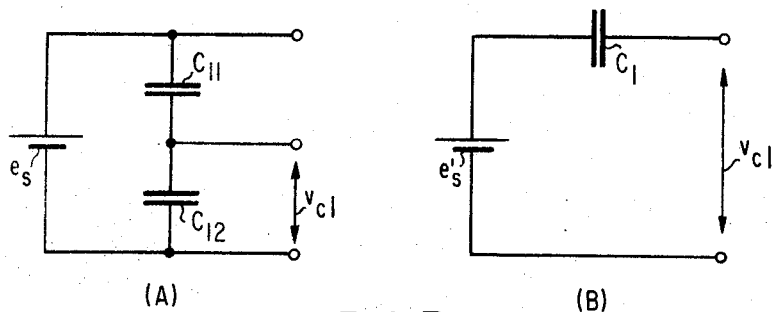
FIGS. 3A and 3B are simplified circuits of a portion of the circuit illustrated in FIG. 1 and are utilized to describe the operation of the embodiment of the invention illustrated in FIG. 1.

Consideration of the primary section of the circuit illustrated in FIG. 1 can be simplified by visualizing $e_s$ and $C_{11}$ and $C_{12}$ in terms of their "equivalent" circuit as illustrated in FIGS. 3A and 3B. More specifically, the circuit illustrated in FIG. 3B which comprises a single capacitor designated $C_1$ connected with a voltage source designated $e'_s$ is equivalent of the circuit illustrated in FIG. 3A for each individual cycle of operation provided the initial charge on $C_1$ is interpreted correctly. It will be understood by those skilled in the art that $e'_s = e_s/2$ and $C_1 = 2C_{11}$ or $2C_{12}$ (assuming $C_{11} = C_{12}$, which assumption is made here).

Figure 4:
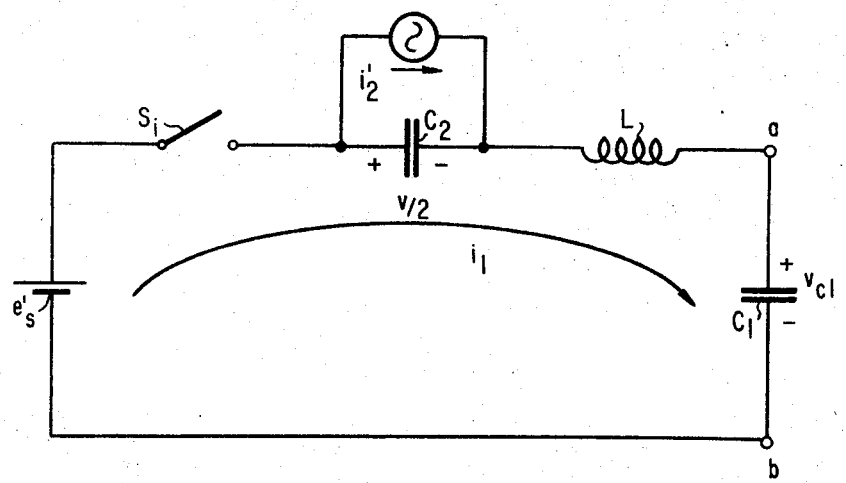
FIG. 4 is an equivalent circuit utilized to describe the operation of the embodiment of the invention illustrated in FIG. 1.

An equivalent circuit of the converter illustrated in FIG. 1 for each cycle of operation is illustrated in FIG. 4. FIG. 4 comprises $e'_s$ connected in series with: a switch designated $S_l$; a capacitor designated $C_2$; an inductor designated L; and, $C_1$. A voltage source designated $i'_2$ is connected in parallel with $C_2$. Capacitor $C_2$ represents the equivalent of filter capacitor $C_o$ of FIG. 1 reflected into the primary section; that is:

$$c_2 = (N_2/N_1)^2 C_o \quad (2)$$

Current source $i'_2$ represents the essentially constant load current $V_o/R_L$ reflected into the primary circuit. For purposes of the following discussion, it is assumed that:

1. All components in the equivalent circuit of FIG. 4 have ideal characteristics. This assumption will be modified subsequently.
2. Current $i'_2$ discharges capacitor $C_2$ in such a manner that it will return to one and the same potential, $v_2 = v_x(t_k)$, before initiation of any current pulse.
3. Capacitor $C_1$ is turned around end to end between circuit terminals a (the junction between L and $C_1$) and b (the junction between $C_1$ and $e'_s$) after each current pulse and before the initiation of the succeeding pulse such that under conditions of cyclic stability:

$$v_{c1}(t_{k+1}) = -v_{c1}(t_k + T_k), \text{ and} \quad (3)$$
$$v_{c1}(t_k) = -v_{c1}(t_{k+1} + T_{k+1}). \quad (4)$$

4. Capacitor $C_1$ is initially charged to a potential $v_{c1}(t_k)$, a negative value.

When switch $S_i$ closes at time $t = t_k$, the equilibrium in the equivalent circuit illustrated in FIG. 4 is governed by the relation $$e_s'(t) = L \, di/dt + v_{c1}(t_k) + v_2 + \frac{1}{C}\int_{t_k}^{t} i_1 dt \quad (5)$$

for $t_k < t < t_k + T_k$ and $\Delta v_{c2}/\Delta T_k \approx 0$ such that $v_{c2}(t_k) = v_2$. If C is defined as $C = C_1 C_2/(C_1 + C_2)$, the current $i_1(t)$ is readily determined from relation (3) as:

$$i_1(t) = \Delta v \sqrt{C/L} \sin \omega_o t \quad (6)$$

where;

$$\Delta v = e'_s - v_{c1}(t_k) - v_2 \quad (7)$$
$$\omega_o = 1/\sqrt{LC} \quad (8)$$

Figure 2C:
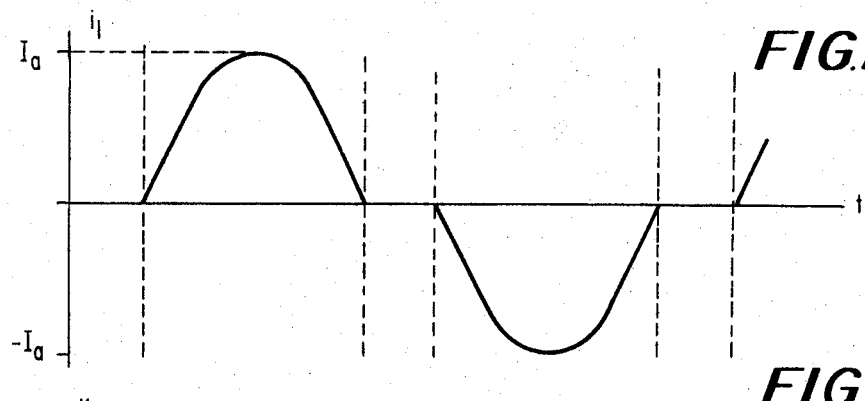

Relation (6) confirms the expected sinusoidal character of $i_1$, as illustrated in FIG. 2C. The amplitude $I_a$ of the half sinusoids is now readily expressed as:

$$I_a = \sqrt{C/L} \, [e_s/2 - v_{c1}(t_k) - v_2] \quad (9)$$

Figure 2D:
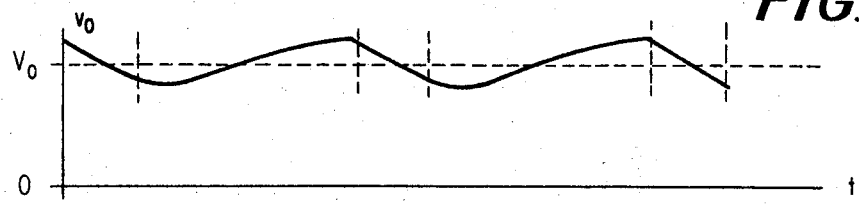

The output voltage variations, as illustrated in FIG. 2D, depend on the load $R_L$, the pulse repetition rate, and the size of capacitor $C_o$.

Voltage $v_{c1}(t)$ across capacitor $C_1$ is expressed as:

$$v_{c1}(t) = v_{c1}(t_k) + \frac{1}{C_1}\int_{t_k}^{t} i_1 dt \quad (10)$$

and at time $t_k + T_k$ assumes the value:

$$v_{c1}(t_k + T_k) = v_{c1}(t_k) + \Delta v \left[\frac{2C_2}{C_1 + C_2}\right] \quad (11)$$

where:

$$T_k = \pi \sqrt{LC} \quad (12)$$

The behavior of a highly underdamped RLC circuit is briefly considered next. The series resistive element $R_S << \sqrt{L/C}$ is assumed to be sufficiently small to permit use of the relations governing lossless LC circuits except for a small, but finite loss of energy during each half cycle of oscillation. Referring to FIG. 4, capacitor $C_1$ is charged to potential $v_{c1}(t_k)$, a negative value, and switch $S_i$ is opened. It is assumed at this point that $e'_s = 0$ and that $C_2$ is short circuited. Under these conditions, switch $S_i$ is closed and the potential on capacitor $C_1$ is reversed by a resonant current through inductor $L_1$, capacitor $C_1$, and the short circuited element $C_2$. Switch $S_i$ is opened immediately after reversal of charge on capacitor $C_1$ and $$v_{c1}(t_m + T_m) = -x v_{c1}(t_m) \quad (13)$$

where $$1 - x << 1 \quad (14)$$

Figure 5:
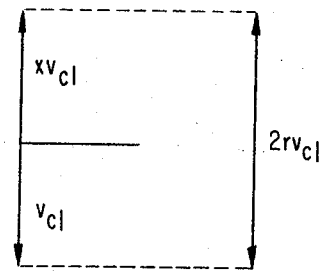
FIG. 5 is a symbolic diagram of the voltage variations across a particular capacitor illustrated in FIG. 4.

The factor $1 - x$ indicates the loss of energy due to the presence of the series resistance $R_s$. The associated potentials are indicated symbolically in FIG. 5.

By considering the difference of potential $2r v_{c1}$ across capacitor $C_1$ rather than the individual potentials before and after charge reversal, the following relation can be formed:

$$2r v_{c1} = (1 + x) v_{c1} \quad (15)$$

The energy $\epsilon_R$ dissipated in resistance $R_S$ during charge reversal and the ensuing loss of energy $\Delta \epsilon_c$ in capacitor $C_1$ are related as:

$$\epsilon_R = \int_0^{\pi\sqrt{LC}} i^2 R_s dt = \tfrac{1}{2} v_{c1}^2 (1 - x^2) c_1 = \Delta \epsilon_c \quad (16)$$

The solution for the reduction $r$ of the capacitor voltage "swing" due to the presence of series resistance $R_S$ from relations (15) and (16) yields:

$$r \cong 1 - \pi/Q \quad (17)$$

provided:

$$Q >> \pi \quad (18)$$

where:

$$Q = \omega_o L/R_s \quad (19)$$

By introducing the loss factor $r$ into relation (11) which governs the behavoir of the entire equivalent circuit, the following modified equation evolves;

$$v_{c1}(t_k + T_k) = v_{c1}(t_k) + r(v) \frac{2C_2}{C_1 + C_2} \quad (20)$$

where $r$ is associated with the actual voltage "swing" ($\Delta v$) $2C_2/(C_1 + C_2)$ of capacitor $C_1$ in the presence of capacitor $C_2$. A converse relation is developed for the opposite cycle of operation and reads:

$$v_{c1}(t_{k+1} + T_{k+1}) = v_{c1}(t_{k+1}) + r(\Delta v) \frac{2C_2}{C_1 + C_2} \quad (21)$$

As shown above, the polarity of $v_{c1}$ is inverted just before time $t_{k+1}$ to preserve the needed correspondence between the circuit under consideration illustrated in FIG. 1 and its equivalent circuit illustrated in FIG. 4. As previously stated in the initial discussion of FIG. 4, under conditions of cyclic stability:

$$v_{c1}(t_{k+1}) = -v_{c1}(t_k + T_k) \quad (22)$$

and $$v_{c1}(t_k) = -v_{c1}(t_{k+1} + T_{k+1}) \quad (23)$$

The simultaneous solution of relations (20), (21), and (22), yields:

$$v_{c1}(t_k + T_k) = \tfrac{1}{2} \frac{rC_2}{C_1 + C_2} \frac{e_s - 2v_2}{1 - r\frac{C_2}{C_1 + C_2}} \quad (24)$$

It is found further that under the given assumptions $$v_{c1}(t_{k+1} + T_{k+1}) = +v_{c1}(t_k + T_k) \quad (25)$$

Removal of the fiction of a "turned around" capacitor $C_1$ leads to the realization that in the actual circuit shown in FIG. 1 and the associated voltage waveforms in FIG. 2

$$v_{c1}(t_k) = -v_{c1}(t_{k+1}) \quad (26)$$

Introduction of relation (17) into (24) results in $$v_{c1}(t_k + T_k) = \frac{\frac{Q}{\Pi} - 1}{\frac{Q}{\Pi}\frac{C_1}{C_2} + 1} \frac{e_s}{2} - v_2 \quad (27)$$

with the meaning of symbols as previously defined. For $Q >> \pi$ and $C_2 >> C_1$ as often found in practice:

$$v_{c1}(t_k + T_k) \approx (Q/\pi)(e_s/2) - v_2 \quad (28)$$

Relation (28) is a convenient abbreviation of expression (27) and useful for first approximations. However, in some cases it may prove necessary to use the more accurate, previous form.

$Q \to \infty$ for $R_s \to 0$ and $v_{c1}(t_k + T_k) \to (C_2/C_1)(e_s/2 - v_2)$ in the limit, provided $i'_2$ continues to remove energy from capacitor $C_2$. The maximum excursions of $v_{c1}$ are, under conditions of cyclic stability, readily confined for most practically realizable cases of interest.

The power transfer capacity P of the equivalent circuit (FIG. 4) is expressed as:

$$P = \tfrac{1}{2}(2e_s v_{c1})C_1 \, 2f_{smax} = 2e_s v_{c1} C_1 f_{smax} \quad (29)$$

where:

$f_{smax}$ = the highest physically possible frequency of operation $f_s$ and is limited by the inequality $$2f_s < \frac{1}{\Pi\sqrt{LC} + T_{dmin}} = \frac{d}{\Pi\sqrt{LC}} = 2df_o \quad (30)$$

where:

$T_d$ = the time interval between pulses and $T_{dmin}$ is the minimum time required for recovery of the electronic switches;

$d$ = the "duty cycle" of switch operation or ratio of "on" time to the duration of the cycle; and, $f_o$ = the natural frequency of the equivalent resonant circuit illustrated in FIG. 4. The meaning of the other symbols are as previously defined.

At relatively high efficiency of operation, the processed power $P \cong v_2^2/R_L'$, with $R_L'$ being the load resistance reflected into the primary circuit. The relative power loss in the system can be approximated by $$1 - \eta = P^2 \frac{R_s}{R_L' + R_s} \quad (31)$$

where $\eta$ = the efficiency of the system $P$ = the ratio $i_{rms}/i_{av}$ between the rms and the average value of the converter current $i_1$ illustrated in FIG. 2C.

The ratio $$P = \frac{11}{2\sqrt{2}} \sqrt{1 + T_d/(\Pi\sqrt{LC})} \quad (32)$$

is readily verified by inspection and interpretation of FIG. 2C. The efficiency of the system is then expressed, using relations (28) through (32) as:

$$\eta = 1 - \tfrac{1}{4}\left(\frac{e_s}{2v_2}\right) - 1 \frac{e_s}{2v_2} \quad (33)$$

from $$V_2^2/R_L' = 2v_{c1}(t_k)e_s C f_{max} \quad (34)$$

with the restrictions that $R_s << R_L'$ and $Q >> \pi$. The average primary load current $I_{av}$ follows from $$I_{av} = P/v_2 d\eta \quad (35)$$

and its amplitude $$I_a = (\pi/2d)I_{av} \quad (36)$$

follows from interpretation of FIG. 2C. The last two relations are combined to find $$I_a = (1/2\eta)(\pi/d^2)(P/v_2) \quad (37)$$

Other relations for determination of L and C may be gained from the elementary considerations $$I_a = \Delta v \sqrt{C/L} \quad (38)$$

and $$(1/2f_o) = \pi \sqrt{LC} \quad (39)$$

Figure 7:
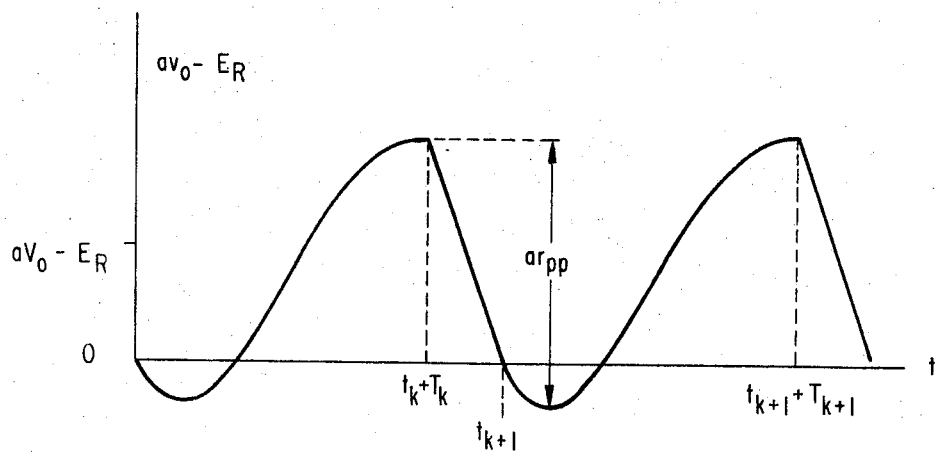
FIG. 7 is a waveform diagram of the difference of voltages applied to the comparator forming a portion of FIG. 6.
Figure 6:
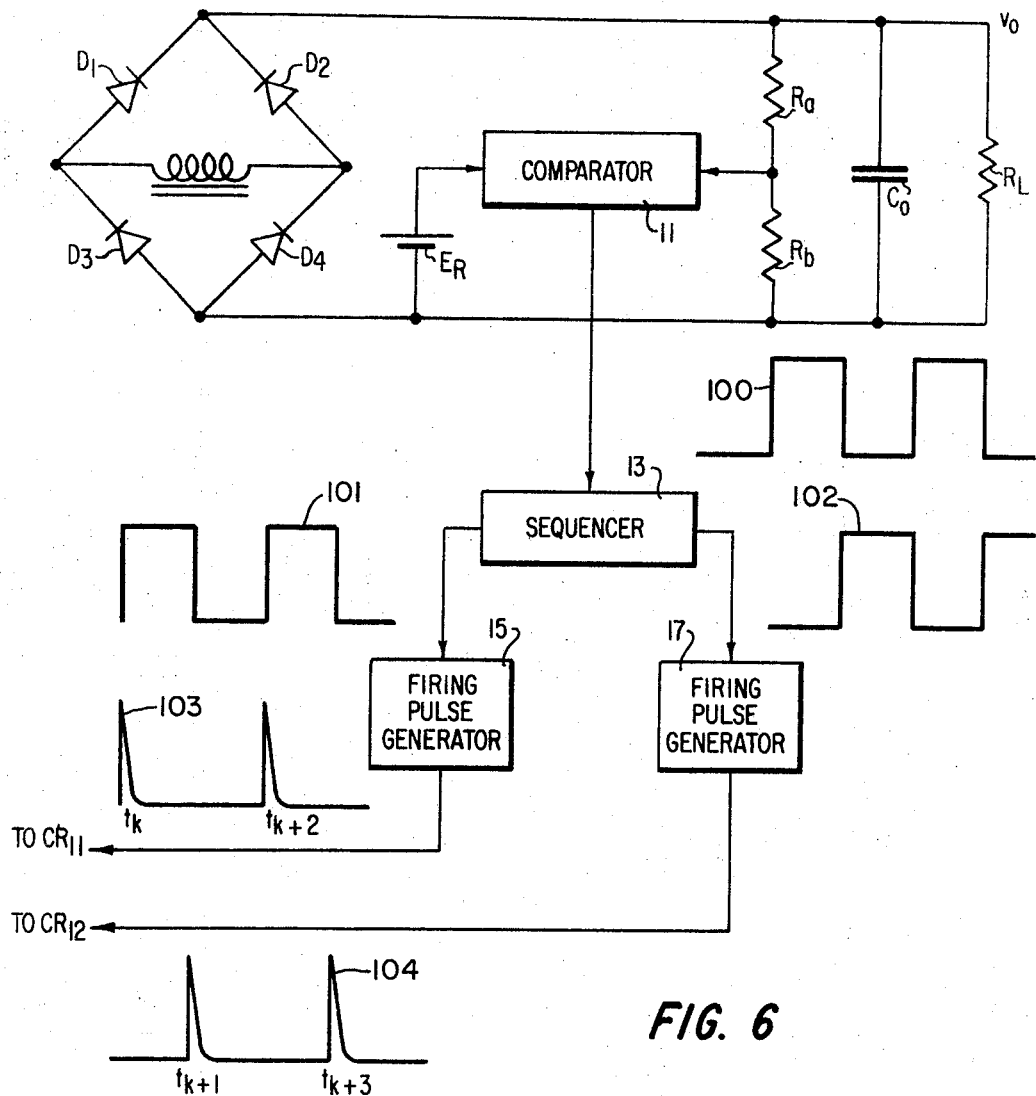
FIG. 6 is a partially schematic and partially block diagram of a converter control system suitable for use with the embodiment of the invention illustrated in FIG. 1 and includes waveshapes found at various points in the circuit.

As illustrated in FIG. 6 and hereinafter described, a simple control system will maintain a relatively constant output voltage $v_o$. If the output signal $av_o$ of a resistive voltage divider consisting of resistors $R_a$ and $R_b$ connected in series across the load as illustrated in FIG. 6 is compared in a comparator 11 to the potential of a voltage reference source $E_R$, the difference between these two signals $av_o - E_R$ as "seen" by the comparator is as illustrated in FIG. 7. The comparator emits a 1–0 signal 100 depending upon whether $av_o - E_R \gtreqless 0$. This 1–0 signal is processed by a sequencer 13 which directs it in alternating succession to first and second firing pulse generators 15 and 17 as waveshapes 101 and 102. The outputs of the firing pulse generators are connected to $CR_{11}$ and $CR_{12}$ (FIG. 1) so that their respective firing pulses 103 and 104 cause conduction of controlled rectifiers $CR_{11}$ and $CR_{12}$ which conduction is terminated after each pulse by resonant turn-off. Continuous converter operation and a minimum output voltage $E_R/a$ is thus maintained. The output voltage:

$$V_o - \tfrac{1}{2} r_{pp} < v_o < V_o + \tfrac{1}{2} r_{pp} \quad (40)$$

is bounded by the two limits indicated by relation (40). The maximum peak to peak voltage ripple $r_{pp}$ of the output voltage $v_o$ follows from simple geometric considerations and partial use of relation (11). The magnitude of this voltage ripple at full load is:

$$r_{pp} = 2\Delta v \left(\frac{C_1}{C_1 + C_2}\right)\left(\frac{v_o}{v_2}\right)\left(\frac{T_d}{\Pi\sqrt{LC} + T_d}\right) \quad (41)$$

with the meaning of symbols as previously described, provided $r_{pp} << V_o$. Recalling that $C_2 = C_o(V_o/v_2)^2$, where $V_o/v_2$ corresponds essentially to the turns ratio $N_2/N_1$ of the power transformer, the ripple $r_{pp}$ then becomes a function of the output filter capacitor $C_o$, the load $R_L$ and the pulse repetition rate $2f_t$. For the foregoing discussion it can be seen that the frequency of operation decreases linearly with decreasing load. The output voltage ripple can increase in the limit to:

$$r_{ppmax} = 2\Delta v \frac{C_1}{C_1 + C_2} \frac{v_o}{v_2} \quad (42)$$

under virtual zero load conditions.

In some environments the operation of a series capacitor inverter with silicon controlled rectifier switches formed in accordance with the invention may require protective measures to prevent simultaneous conduction by both switches. This is accomplished by gating the firing pulses to the individual controlled rectifiers such that no firing pulse will reach its destination unless current flow in the companion controlled rectifier has ceased for at least a minimum length of time where the required additional time interval corresponds to the recovery time $T_{dmin}$ of the silicon controlled rectifier switches.

The previously derived voltage excursions $v_{c1}$ of capacitor $C_1$ are valid for steady state operation. However, the secondary winding $W_2$ of the transformer appears to be temporarily short circuited by capacitor $C_o$ and the external load during turn on of the system. Hence, the excursions $v_{c1}$ of the voltages on capacitor $C_1$ are substantially larger during this transient phase. These substantial potentials require considerable excess tolerance of the concerned circuit devices, expressed in terms of their voltage rating, especially those of the controlled rectifier switches. A circuit that prevents the occurrance of the voltage "overshoots" or transmits associated with turn-on of the system is illustrated in FIG. 8 and discussed next.

Figure 8:
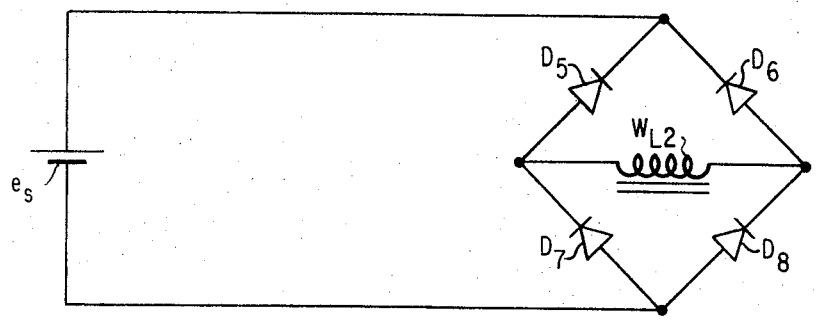
FIG. 8 is a schematic diagram of a clipping circuit suitable for use with the embodiment of the invention illustrated in FIG. 1.

The circuit illustrated in FIG. 8 comprises a winding $W_{L2}$ which is inductively coupled to $W_{L1}$ illustrated in FIG. 1. The circuit illustrated in FIG. 8 also comprises four diodes designated $D_5$, $D_6$, $D_7$ and $D_8$. The cathodes of $D_5$ and $D_6$ are connected together as are the anodes of $D_7$ and $D_8$. The cathode of $D_6$ is connected to the anode of $D_5$ and the cathode of $D_8$ is connected to the anode of $D_6$. Hence, a diode bridge circuit is formed. $W_{L2}$ is connected from the junction between $D_5$ and $D_7$ to the junction between $D_6$ and $D_8$. The cathodes of $D_5$ and $D_6$ are connected to the positive terminal of $e_s$ and the anodes of $D_7$ and $D_8$ are connected to the negative terminal of $e_s$. The turns ratio $(N_{L1}/N_{L2})$ of $W_{L1}$ to $W_{L2}$ is such that:

$$\frac{N_{L1}}{N_{L2}} = \frac{v_{c1max} + e_s/2 - v_2}{e_s} = \frac{v_{max}}{e_s} \quad (43)$$

Figure 9A:
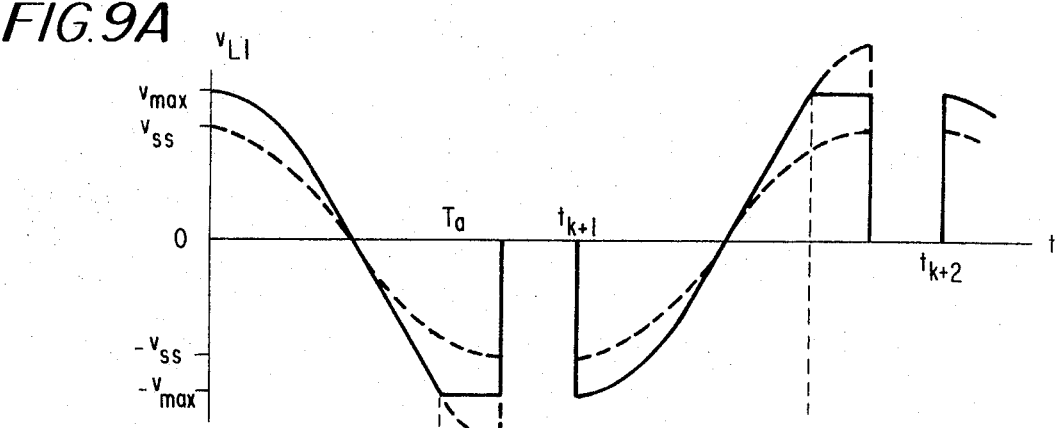
FIGS. 9 A–C are waveform diagrams utilized to describe inductive energy transfer.
Figure 9B:
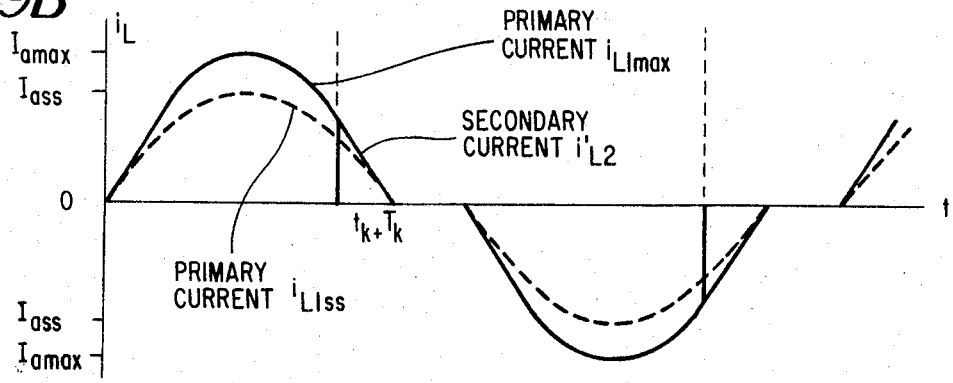
Figure 9C:
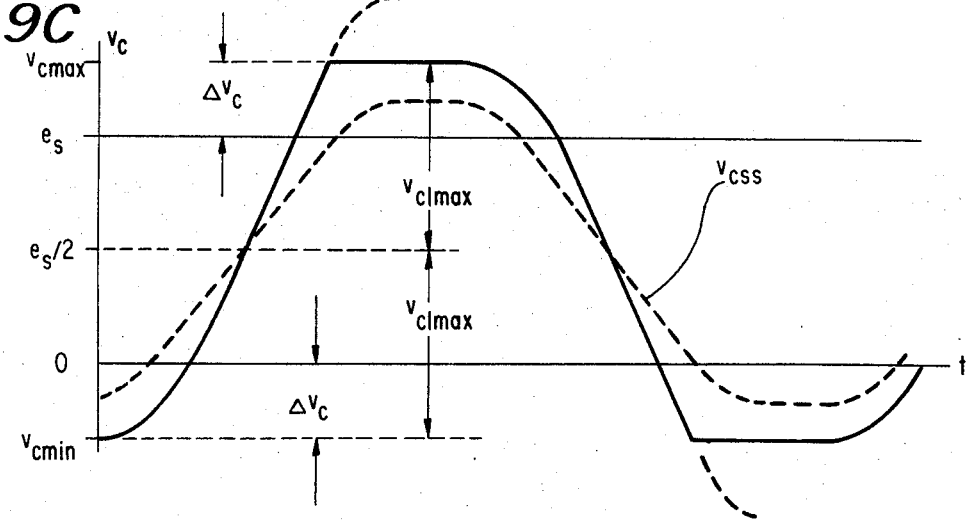

The significant voltage and current waveforms associated with the circuit illustrated in FIG. 8 are illustrated in FIGS. 9A–C. The maximum excursion of the capacitor voltage $v_c$ (across $C_{11}$ or $C_{12}$) shown in FIG. 9C is bounded by clamping of the secondary inductor winding to the source voltage $e_s$ as expressed by relation (43).

The quasi sinusoidal steady state voltage $v_{L1}$ with amplitude $\Delta v_{ss}$ across inductor L is indicated by the dashed curves in FIG. 9A. The diode bridge circuit associated with the secondary inductor winding $W_{L2}$ as illustrated in FIG. 8 remains non-functional when the secondary inductor voltage $v_{L2} < e_s$. However, when $v_{L2} = e_s$, the diode bridge clamps $v_{L2}$ to $e_s$ and the corresponding primary inductor potential $v_{L1}$ to a fixed voltage level $\Delta v_{max}$. The ensuing voltage waveform $v_L$ is indicated by the solid curves in FIG. 9A. The voltage waveform $v_{L1}$ is "arrested" at time $T_a$ in the cycle and so is the capacitor voltage $v_c$ with value $v_{cmax}$ at that time. The arrest of the capacitor voltage $v_c$ is due to the fact that the only source of electric energy which causes an increase of $v_c$ after $t > t_k + (\pi/2)\sqrt{LC}$ is the energy stored in the inductor, since $v_{cmax} > e_s$. Current $i_1$ indicated in FIG. 1 is thus terminated when $dv_L/dt = 0$ since $Cdv_c/dt = 0$, and $CR_{11}$ will open. The capacitor current $i_1$ is identical with the current $i_L$ in the primary inductor winding $W_{L1}$ shown in FIG. 9B for $t_k > t < t_k + T_a$. For $t_k + T_a < t < t_{k+1}$, $i_1 = 0$. The magnetic energy remaining in the inductor is discharged into the source of electric energy $e_s$ through the diode bridge in FIG. 8.

If $de_s/dt = 0$
then:

$$i_{l2}(t) = \begin{cases} 0 \text{ for } t_k < t < t_k + T_a \\ \frac{\Delta v_{max}}{e_s} i_{l1}(t_k + T_a) - \frac{e_s t}{L_2} \text{ for } t > t_k + T_a \end{cases} \quad (44)$$

in each cycle where $L_2$ is the inductance of inductor L as viewed from the terminals of winding $W_{L2}$.

The voltage waveform $v_c$ shown in FIG. 9C is self-explanatory, and illustrates the objective of this nondissipative clipping technique. The series capacitor voltage "swing" is limited to $2v_{c1max}$ with $v_{cmax}$ as its upper limit and $v_{cmin}$ as its lower limit. These limits are dictated by the maximum ratings of components, especially the ratings of the semiconductor switching elements chosen for a particular embodiment of the invention. The dashed curve in FIG. 9C indicates the capacitor voltage waveform $v_c$ under steady state operating conditions—when the secondary inductor winding remains inoperative and when primary circuit operation is not affected by the presence of winding $W_{L2}$. An excessive overshoot $\Delta v_c$ of the capacitor voltage $v_c$ during turn-on conditions is thus prevented by clipping of this voltage at preset levels, and the system "ignores" this imposed limitation during steady state operation.

Figure 10:
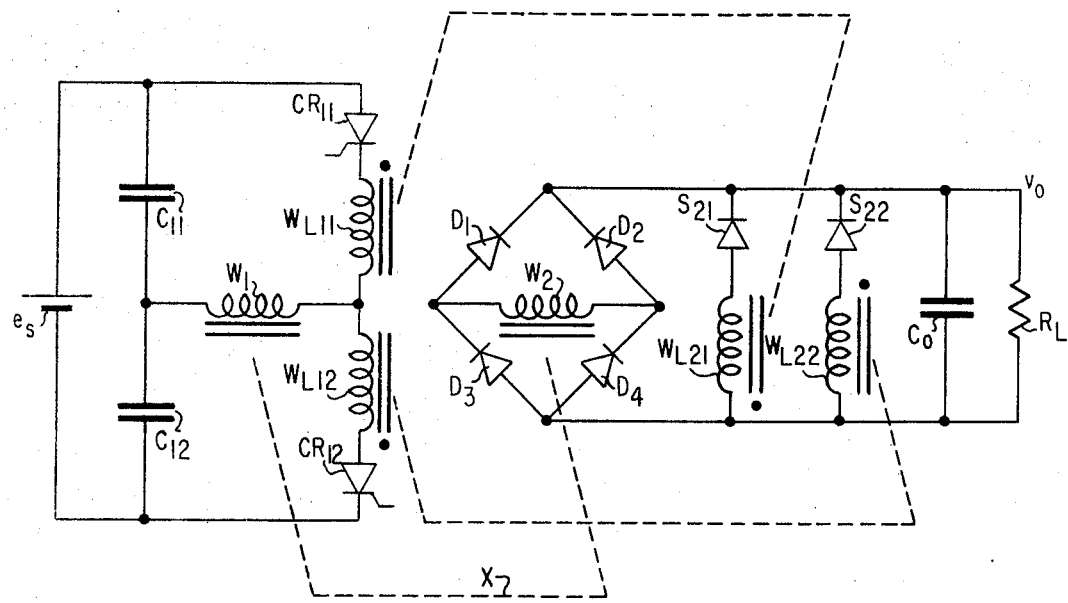
FIG. 10 is a simplified schematic diagram of an alternate embodiment of the invention which utilizes inductive energy transfer.

In accordance with a further aspect of the invention, a similar technique is used to transfer excess energy from the series inductor to the load. More specifically, two inductor primary windings designated $W_{L11}$ and $W_{L22}$ are connected in series between the anodes of $CR_{11}$ and $CR_{12}$ as shown in FIG. 10. The junction between $W_{L11}$ and $W_{L12}$ is connected to one side of $W_1$. The inductor secondary windings $W_{L21}$ and $W_{L22}$ are each associated with a solid state secondary switch $S_{21}$ or $S_{22}$, such as a diode. More specifically, $S_{21}$ is connected in series with $W_{L21}$ between the anodes of $D_1$ and $D_2$, and the cathodes of $D_3$ and $D_4$. Similarly, $S_{22}$ is connected in series with $W_{L22}$ between the anodes of $D_1$ and $D_2$, and the cathode of $D_3$ and $D_4$. The solid state switches $S_{21}$ and $S_{22}$ are back biased during the first half of their individual resonant half cycles as illustrated by the dots on the various inductor windings. The switches $S_{21}$ and $S_{22}$ will conduct during portions of the second half of each individual resonant interval provided:

$$v_{L1i} \frac{N_{L2i}}{N_{L1i}} > v_o \text{ (}i \text{ being either 1 or 2, as the case may be)} \quad (45)$$

where $N_{Lij}$ = number of turns in respective inductor windings and $V_{L1i}$ = the inductor primary voltage ($i$ and $j$ being either 1 or 2, as the case may be) and with the meaning of the other symbols being as previously defined. The instant, $T_{ao}$, at which conduction in the secondary inductor windings is established is determined by the relation $$T_{ao} = \sqrt{LC} \left\{ 11 - \arccos \frac{v_o}{v_{L1i}} \frac{N_{L1i}}{N_{L2i}} \right\} \quad (46)$$

for $$(\pi/2)\sqrt{LC} < T_{ao} < \pi\sqrt{LC} \quad (47)$$

with the meaning of all symbols being as previously defined. The potential $\Delta v = e_s/2 - v_2(t_k) - v_{c1}(t_k)$ is variable under transient conditions, such as turn-on, since the load voltage reflected into the primary circuit $v_2(t_k)$ varies from cycle to cycle starting from zero to its steady state value $v_2$. The cut in time $T_{ao}$ of the secondary inductor circuits varies accordingly, but the absolute maximum excursions of the capacitor voltages $v_{cmax}$ and $v_{cmin}$ remain bounded until the output $v_o$ approaches its intended level. If desired, the turns ratio $N_{L2i}/N_{L1i}$ can be, again, chosen in such a manner that inequality (45) is not satisfied during conditions of cyclic stability, in order that the inductive energy transfer remain only effective during transient conditions of operation. Alternatively, however, this embodiment may be operative during steady state operation, since it transfers energy to the load and therefore results in more efficient operation. If steady state operation is desired, the inductors must be, of course, appropriately designed.

If desired, a further degree of freedom can be added to the invention by the addition of a controlling function to the switching elements $S_{2i}$ associated with the secondary inductor windings. This can be implemented by using controlled rectifiers in place of the diodes and providing them with appropriate gating signals.

The cut in time $T_a(k)$ now becomes a variable and can be freely chosen provided $$T_{ao} \leq T_a(k) \leq \pi\sqrt{LC} \quad (48)$$

Thus the invention can be used to reduce the swing of the capacitor voltage $v_{c1}$ as expressed by relations (27) or (28) to any value, as long as:

$$v_{c1}(t_k + T_k) \quad (Q/\pi)(e_s/2 - v_2) \quad (49)$$

So far, only the effect of variations of $v_2$, such as during turn-on of the system, and its suppression has been discussed. Another cause of build-up of excessive capacitor voltage can be a variation of the source voltage $e_s/2$. The quality $Q$ of the circuit is, preferably, relatively high so as to provide the system with an acceptable efficiency. The difference $e_s/2 - v_2$ is in turn relatively small, and the product $Q/\pi (e_s/2 - v_2)$ will vary by the multiple $Q/\pi$ of any variation of the difference $e_s/2 - v_2$.

If the source voltage $e_s$ varies to any significant extent, the system ceases to operate if $e_s/2 \leq v_s$, as is self-evident from an inspection of FIG. 4. The capacitor voltage $v_c$ may exceed a safe maximum $v_{cmax}$ if $e_s/2$ substantially exceeds $v_2$, as indicated by relations (27) and (28). The method of capacitor swing limitation previously discussed with reference to FIG. 10 not only prevents the build-up of an excessive voltage $v_c$, but also permits operation of the system with a virtually constant rms current, even though the source voltage $e_s$ substantially increases. Maintenance of a constant current ratio $\rho$, as defined in relation (31), for a given load and for a widely varying source voltage $e_s$ offers the unparalleled advantage of constant efficiency over a wide range of source voltages. This unique property of the invention is hereinafter discussed with reference to FIG. 11.

Figure 11:
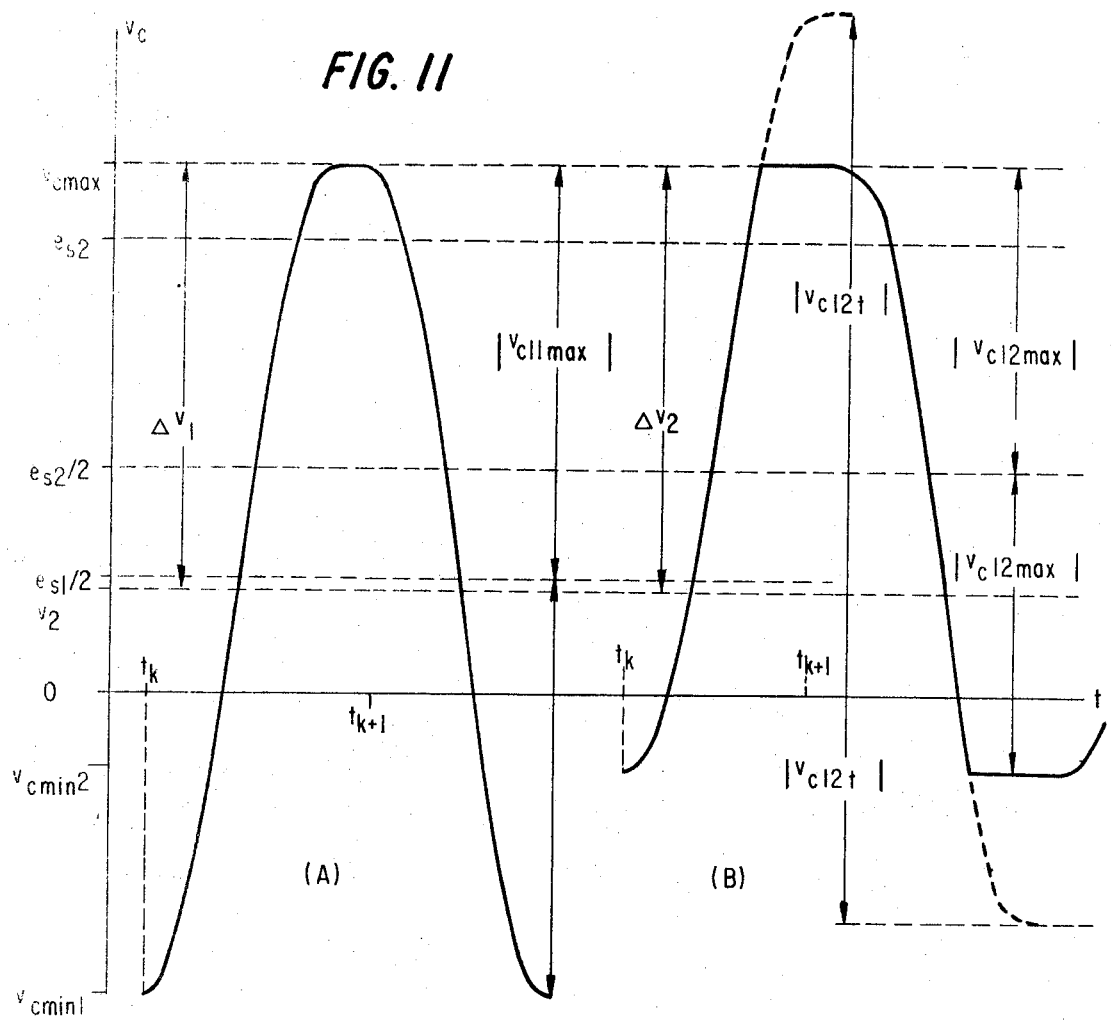
FIGS. 11A and 11B are capacitor voltage waveform diagrams utilized to illustrate the operation of the system from source voltages of different levels for constant efficiency at a given load.

In FIG. 11 the capacitor voltage waveform $v_c$ is shown for: (A) a source voltage $e_{s1}$; and, (B) a source voltage $e_{s2} = be_{s1}$, where $b > 1$. The objective of the invention is to maintain the difference voltage $\Delta v$ defined in relation (7) constant for any value of $e_{s1} \leq e_s \leq e_{s2}$ such that the current amplitude $I_a$ expressed by relation (9) remains invariant. The difference voltage $\Delta v$ associated with each of these two voltages is provided with an index $\Delta v_i$ ($i = 1, 2$) for purposes of distinction. It is thus desired that:

$$\Delta v_1 = e_{s1}/2 - v_{c11}(t_k) - v_2 = e_{s2}/2 - v_{c12}(t_k) - v_2 = \Delta v_2 \quad (50)$$

where the capacitor voltage amplitudes $v_{c11}(k)$ also appear with an index for purposes of distinction. It becomes immediately evident that $v_i$ will remain unchanged if $$e_{s1}/2 - v_{c11}(t_k) = e_{s2}/2 - v_{c12}(t_k) \quad (51)$$

Recalling from relations (22) and (23) that $v_{c11}(t_k)$ or $v_{c1tmax}$ are negative values, the relationship between the $v_{c11}$ is readily established as $$v_{c12}(t_k) = (e_{s1}/2)(b-1) + v_{c11}(t_k) \quad (52)$$

In addition, $$v_{c12}(t_k) > be_{s1}/2 \quad (53)$$

to permit secure turn-off of the controlled rectifiers, and $e_{s1}/2 - v_{c11}(t_k)$ must be smaller than the safe operating voltage of the concerned components.

The circuit illustrated in FIG. 10 carries out the foregoing requirements because the secondary inductor voltage cuts in whenever $v_{L2}$ attempts to exceed the load voltage and thus $$v_{L1}/v_o = N_{L1}/N_{L2} \quad (54)$$

is consistent with relation (43). The initial inductor voltage $\Delta v_i$ is invariant for an invariant output voltage $v_o$ since the inductor winding turns ratio is fixed, hence, the objective of this aspect of the invention is attained. The target values $v_{c12t}(t_k + T_k)$ of the nonrestricted capacitor voltage amplitude $v_{c12}$ associated with the source voltage $e_{s2}$ will, of course, tend to a larger value $$v_{c12t}(t_k + T_k) = v_{c11}(t_k + T_k)\frac{e_{s1} - 2v_2}{e_{s1} - 2v_2} \quad (55)$$

if freed of its constraint, where $v_{c11}(t_k + T_k)$ is the "arrested" capacitor voltage amplitude. It will, however, start each time with the same $\Delta v_1 = \Delta v_2$, whichever of the sources, $e_{s1}$ or $e_{s2}$ powers the circuit. The damping constant of the resonant circuit determines to what extent the voltage amplitude $v_{c1t}$ will tend to increase. The time constant of the exponential term of an RLC circuit is given by $$\alpha = R/2L = \pi/2QT_o \quad (56)$$

where $T_o = \pi\sqrt{LC}$ as defined before. The change in amplitude will attain 63 percent of its final value when $\alpha t_1 = 1$. This point occurs when $t_1 = NT_o$, where $N$ is the number of intervening converter cycles. This number $N$ is readily expressed from $$(\pi/2QT_o) NT_o = 1 \quad (57)$$

as $$N = 2Q/\pi$$

The target value $v_{c12t}(t_k)$ of each cycle of the capacitor voltage amplitude is then:

$$v_{c12t}(t_k) = v_{c11}(t_k)\left\{1 + \frac{11}{2Q}\frac{\frac{e_{s1}}{2v_2}(b-1)}{\frac{e_{s1}}{2v_2} - 1}\right\} \quad (58)$$

using straight line approximation for the incipient portion of the exponential term and relation (52) for determination of $v_{c12}(t)$. The "intended" overshoot of $v_c$ is indicated in FIG. 11B by a dashed curve. The rms content of the converter current associated with the transfer of energy from the source to the load remains virtually unaltered, although part of it flows through the secondary inductor winding.

The embodiment of the invention illustrated in FIG. 10 requires two inductors, each equipped with a secondary winding with sufficient cross-sections of conductors to carry the load current efficiently. A significant weight penalty could be imposed by such a system since, instead of a single inductor, two are required, each with one secondary winding, and possibly involving high voltage insulation.

Figure 12:
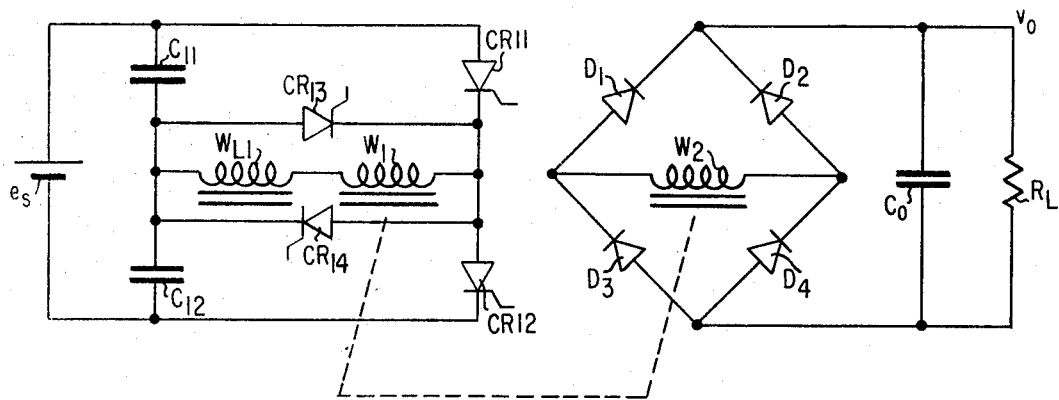
FIG. 12 is a schematic diagram of an alternate embodiment of the invention with constant load efficiency for a range of input voltages and for given output voltages and a given load.

FIG. 12 illustrates an embodiment of the invention wherein the foregoing difficulty is circumvented by employing the main power transformer as the energy transfer and voltage level changing device. The circuit illustrated in FIG. 12 is the same as the circuit illustrated in FIG. 1 with the addition of two silicon controlled rectifiers designated $CR_{13}$ and $CR_{14}$. The cathode of $CR_{13}$ is connected to the cathode of $CR_{11}$ and the anode of $CR_{13}$ is connected to the junction between $C_{11}$ and $C_{12}$. The anode of $CR_{14}$ is connected to the anode of $CR_{12}$ and the cathode of $CR_{14}$ is connected to the junction between $C_{11}$ and $C_{12}$. The circuit illustrated in FIG. 12 operates exactly like the circuit illustrated in FIG. 1, except for the operation of $CR_{13}$ and $CR_{14}$. The primary winding $W_{L1}$ of the inductor is connected in series with the primary winding $W_1$ of the power transformer. The voltage waveform seen by the terminals of $W_{L1}$ is exactly the same as the one shown in FIG. 9A for $T_k < t < t_k + T_a$. The current through $W_{L1}$ is the same as depicted in FIG. 9B for the same time interval; and so is the capacitor voltage $V_c$ shown in FIG. 9C. At time $t = t_k + T_a$ controlled rectifier $CR_{13}$ is fired and clamps the voltage $v_c$ to the cathode of $CR_{11}$ thus extinguishing $CR_{11}$ since $C_1 dv_c/dt = 0$. $W_{L1}$ remains, however, short circuited to $W_1$. Hence, current $i_1$ continues to flow according to the relation $$i_1(t) = i_1(t_k + T_a) - (v_2/L)t \quad (59)$$

for $$t_k + T_a < t \text{ and } i_1 > 0 \quad (60)$$

This current is stepped up or down by the transformer and transferred to the load. No additional power loss is created by addition of the two new controlled rectifiers since the primary current negotiates only one semiconductor voltage drop at one time, as before. The firing signals for $CR_{13}$ and $CR_{14}$ are readily derived from a secondary signal winding coupled to $W_{L1}$ operating against some constant reference voltage, or an appropriate electronic control circuit which emits a signal when $v_L$ reaches $v_{max}$ of when $v_c$ attains the values $v_{cmax}$ or $v_c^{-}$ min.

The effect of the operation of the circuit illustrated in FIG. 12 is exactly the same as the effect previously discussed with reference to FIGS. 10 and 11, i.e., it affords a safe start-up up of the system with confined excursions of the voltage wave form $v_c$ and a virtually constant efficiency for any given load and for widely varying variations of the source voltage $e_s$.

Figure 13:
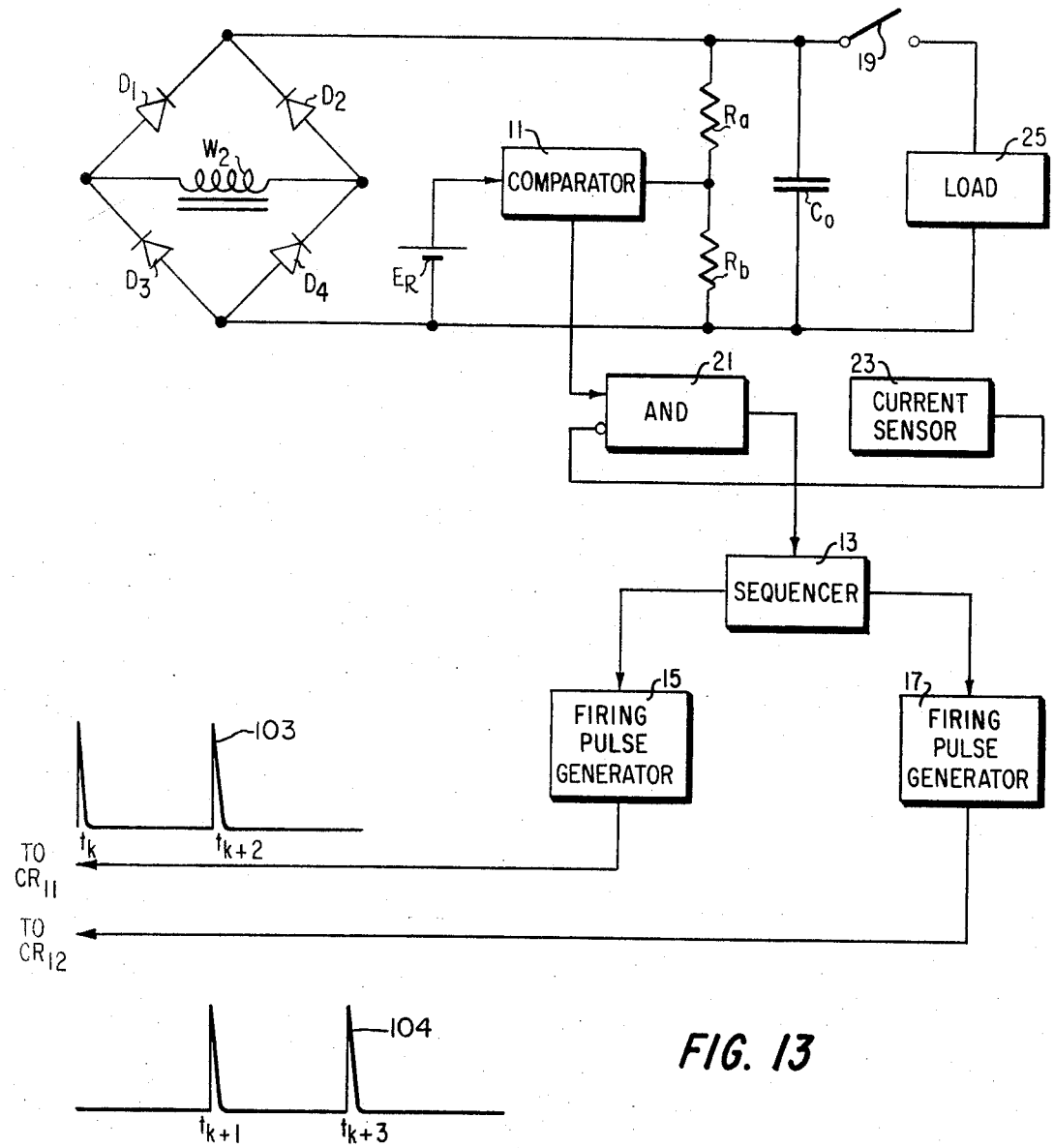
FIG. 13 is a partially schematic and partially block diagram and includes waveshapes of a converter control suitable for use with the embodiment of the invention illustrated in FIG. 1 where the invention is used for the purpose of supplying pulsating power to a load such as radar or laser system.

The previous discussion of the series inverter-converter was limited to its application for scaling and stabilization of the voltage of a source of DC power. However, the basic network can be applied to perform other functions. Several such systems are briefly outlined in the following description. They constitute, however, only an arbitrary sample of potential applications. For example, the DC transformer can supply pulsating power to certain loads such as radar or laser systems. FIG. 13 is partially schematic and partially block diagram of a converter control system suitable for use with the invention for purposes of supplying pulsating power. This illustration is identical with that of FIG. 6 and like parts are identified by like numerals except for some additions which are introduced as part of the following discussion. The output capacitor $C_o$ is charged between individual pulse demands by a load 25 to a preset voltage $V_o$. A current sensor 23 detects the flow of current into the load 25 during each of its work cycles, which is caused by closing of a switch 19, and sends an inhibiting signal to an AND circuit 21 connected between the comparator 11 and the sequencer 13 of the converter control system to prevent the operation of the converter control system until the load current has subsided. Subsequently, the converter resumes operation as discussed with reference to FIG. 6 and recharges its output capacitor $C_o$ and is then ready for the next work cycle. Capacitor $C_o$ is in this case part of the pulse forming network. The advantages of this system are: (1) its high efficiency, since a resonant impedance rather than a resistive element is used to limit the capacitor charging current; and, (2) its elimination of the bulky DC filter normally associated with the efficient supply of power to pulsating loads.

Figure 14:
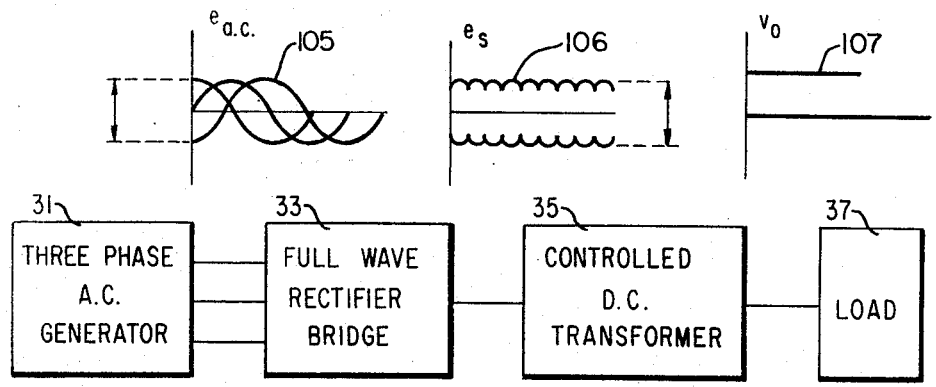
FIG. 14 is the block diagram of a three phase AC to DC converter and is used with the embodiment of the invention illustrated in FIGS. 1, 6 and 8, or 10, or 12 and includes waveshapes.

Also, in controlled three-phase AC to DC conversion, the power derived from a source of conventional three phase AC power 31, as illustrated by waveshape 105, is first processed by a full wave rectifier bridge 33 as illustrated by FIG. 14 to produce waveshape 106 and then by a controllable DC transformer 35 formed in accordance with the invention to produce waveshape 107. A load 37 receives DC power with stabilized voltage, or current, or energy per unit of time, as required. The system performs the functions of: (1) conversion of three phase AC to DC power; (2) voltage scaling; (3)

voltage, current, or power stabilization; and, (4) rejection of the AC ripple $r(t)$ contained in the rectified voltage waveform $e_s(t)$ by an active filtering process. The advantages of this system resides in the elimination of the conventional needs for: (a) a low frequency transformer to scale $e_s(t)$; and, (b) a low pass filter for rejection of the AC content of $e_s(t)$, where both (a) and (b) constitute the main cause of bulk, weight and cost of conventional AC to DC conversion equipment.

In other applications, the invention can be used as an amplifier of unipolar signals. Substitution of a time-varying signal $e_r(t) > 0$ for the fixed voltage reference signal $E_R$ discussed with FIG. 6 results in a time varying output voltage $v_o(t)$. If the load impedance $Z_L$, the capacitor $C_o$ and the inversion frequency band are appropriately chosen, then $v_o(t) \cong e_r(t)$ independent of the variations of $e_s(t)$.

Figure 15:
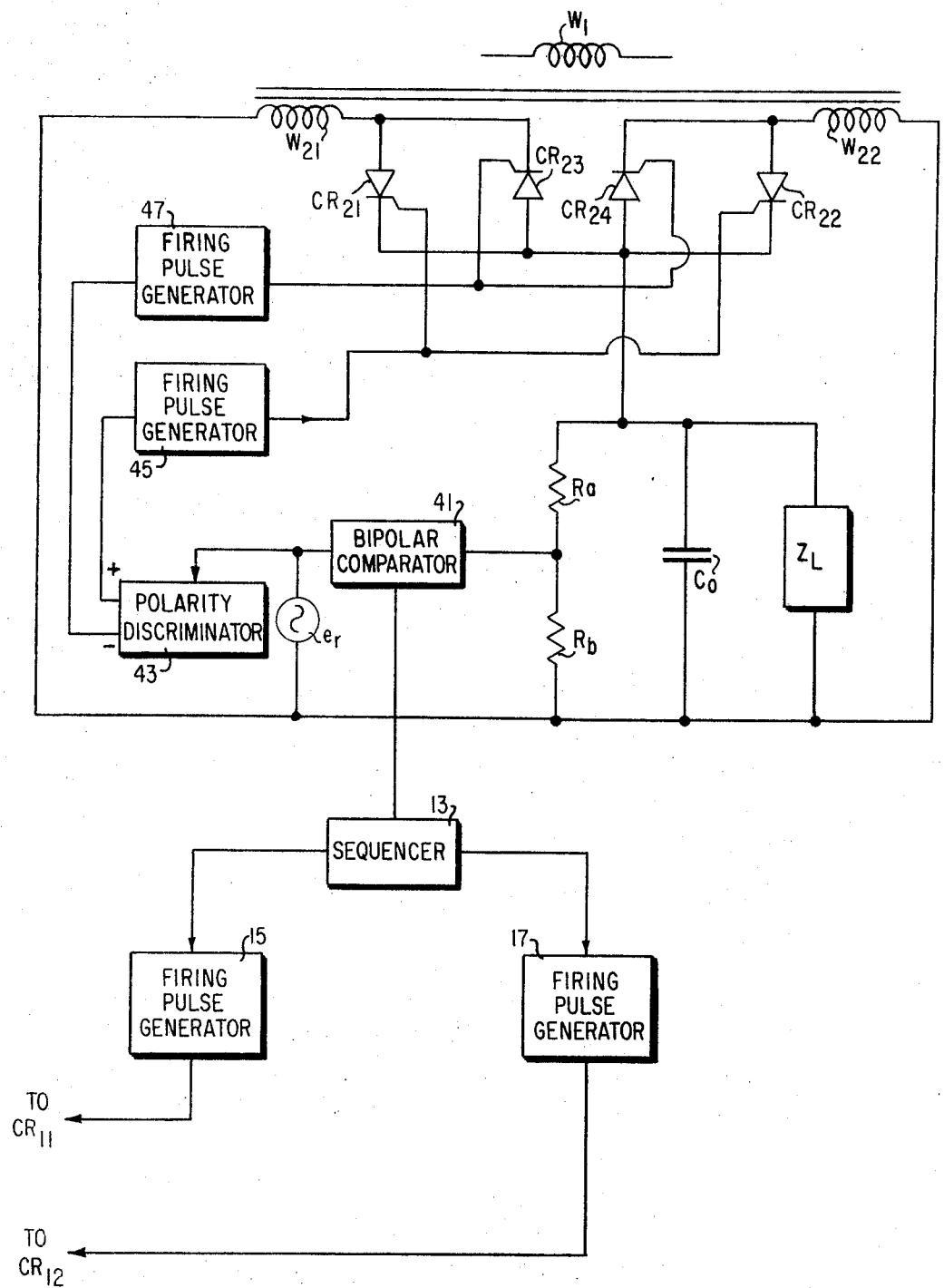
FIG. 15 is a partially schematic and partially block diagram of the output circuit of a power amplifier and is used with the embodiment of the invention illustrated in the FIGURES cited with reference to FIG. 14.

A logical extension of the preceding discussion of an amplifier of unipolar signals leads to an amplifier of bipolar signals. The secondary circuit of such an amplifier is shown in FIG. 15. Its primary circuit is identical with that shown in FIG. 1. The uncontrolled switching elements ($D_1$, $D_2$, $D_3$, and $D_4$) in the rectifier circuit shown in FIG. 1 are replaced by controlled unilateral switches, such as controlled rectifiers $CR_{21}$, $CR_{23}$, $CR_{22}$, and $CR_{24}$. The secondary winding $W_2$ of the power transformer is, furthermore, split into two secondary windings $W_{21}$ and $W_{22}$. A bipolar signal $e_r(t) \gtreqless 0$ is compared by a bipolar comparator 41 to the output voltage $hv_o(t)$ instead of the unipolar signal previously described and then processed by sequencer 13 and firing pulse generators 15 and 17 as previously described with reference to FIG. 6. The bipolar comparator is devised to energize the sequencer whenever, for equal polarity of $e_r$ and $v_o$ and for a preset margin:

$$|hv_o| < |e_r| \qquad (61)$$

A polarity discriminator 43 senses the polarity of the control signal $e_r$ and energizes a third firing pulse generator 45 if $e_r > o$, and a fourth firing pulse generator 47 if $e_r < o$. These generators close switches $CR_{2i}$ according to the polarity of $e_r$ and this signal is thus reproduced at the load $Z_L$ consistent with the philosophy of operation of this converter. The classical example for application of such an amplifier is the inversion of DC to AC power with sinusoidal voltage waveform, where the primary electric energy can be derived from a DC source as previously discussed, or from a three phase AC source of electric energy as discussed with reference to FIG. 13.

Figure 17A:
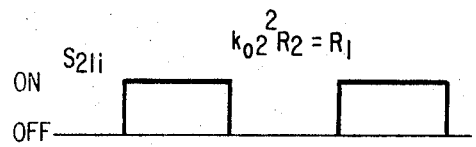
FIGS. 17A and 17B are symbolic illustrations that indicate the current flow in the output circuits illustrated in FIG. 16; and, FIG. 18 is a partially schematic and partially block diagram of a control system for a converter with two independently controlled loads and is suitable for use with the embodiment of the invention illustrated in the FIGURES cited with reference to FIG. 14.
Figure 17A:
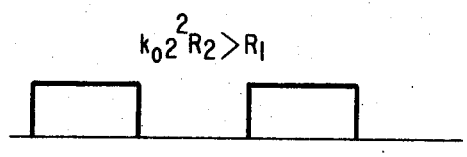
Figure 17B:
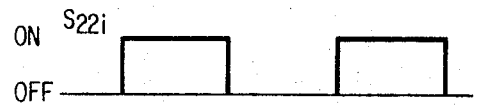
Figure 17B:
Figure 16:
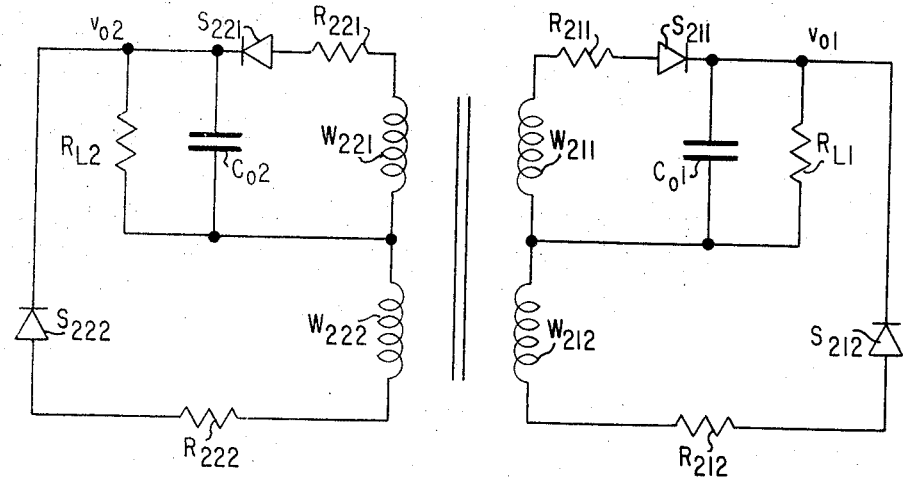
FIG. 16 is a schematic diagram of the output circuits for two parallel loads and is used with the embodiment of the invention illustrated in the FIGURES cited with reference to FIG. 14.

The inventive networks can also be used to power several loads simultaneously as is customary with related types of networks, such as the parallel inverter-converter. The case where the voltage $v_{o1}$ of one of two DC loads is closely controlled and the voltage of $v_{o2}$ of the other load is "slaved" to it, is discussed first with reference to FIG. 16. Shown in FIG. 16 are two centertapped secondary windings $W_{21l}$ and $W_{22l}$ of the power transformer which powers loads $R_{L1}$ and $R_{L2}$ via corresponding pairs of diode switches $S_{21i}$ and $S_{22i}$, respectively. The output voltage $v_{o1}$ indicated in FIG. 16 is controlled by an electronic mechanism as discussed with reference to FIG. 6. A predetermined average output voltage $V_{o1}$ is maintained at load $R_{L1}$ independent of the loading caused by $R_{L2}$, provided that the maximum energy transfer capacity of the primary converter circuit is not exceeded. This behavior is rooted in the functional philosophy of the control mechanism which will call for another pulse (supply of energy) independent of the nature of causes that led to the condition of $hv_{o1} \leq E_R$. If the unilateral controllable switches $S_{2ij}$ were ideal and all $R_{2ij} = 0$, then $v_{o2}$ is related to $v_{o1}$ by the turns ratio $N_{21}/N_{22} = k_{o2}$ of the windings $W_{22l}$ and $W_{21l}$ such that $k_{o2}v_{o2} \cong v_{o1}$. Capacitor $C_{o2}$ looks through switches $S_{22l}$ and $S_{21l}$ onto capacitor $C_{o1}$ as reflected into the circuit of $R_{L2}$ whenever these switches are closed. If $k_{o2}v_{o2} > v_{o1}$ then switch $S_{22l}$ opens (the diode is back biased) and current flow toward load $R_{L2}$ is interrupted. Conversely, if $hk_{o2}v_{o2} = hv_{o1} < E_R$ then the control mechanisms associated with load $R_{Ll}$ calls for another pulse, even though the deffficiency of $v_{o1}$ was actually caused by load $R_{L2}$. The voltage $v_{o2}$ of load $R_{L2}$ is thus slaved to the voltage $v_{o1}$. Furthermore, if $R_{L2}k_{o2} = R_{L2}' = R_{L1}$ and if concurrently $C_{o2}/k_{o2}^2 = C_{o2}' = C_{o1}$ then switches $S_{21l}$ and $S_{22l}$ conduct the respective load current during concurrent and equal time intervals. This is symbolically indicated in FIG. 17A. If, however, $R_{L2}' \neq R_{L1}$ and/or $C_{o2}' \neq C_{o1}$, the load current associated with the smaller load, for example, $R_{L2}$, will flow during shorter time intervals than its companion load current, because $v_{o2} = v_{o1}$. This is indicated in FIG. 17B. The uncontrolled unilateral switches $S_{22l}$ thus perform concurrently and automatically the functions of rectification and pulse width modulation without application of any mechanism to control the circuit elements associated with load $R_{L2}$.

Figure 18:
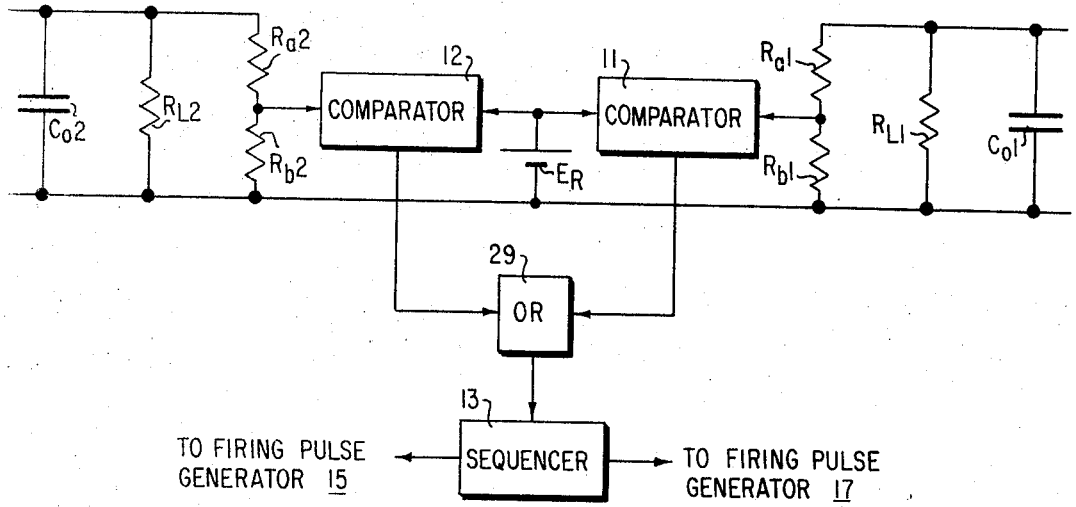
Figure 19:
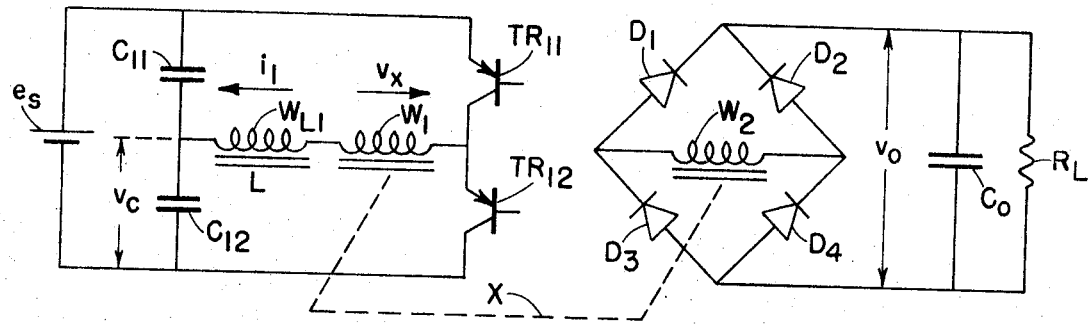
FIG. 19 illustrates the circuit of FIG. 1 wherein transistors are utilized as switches.
Figure 20:
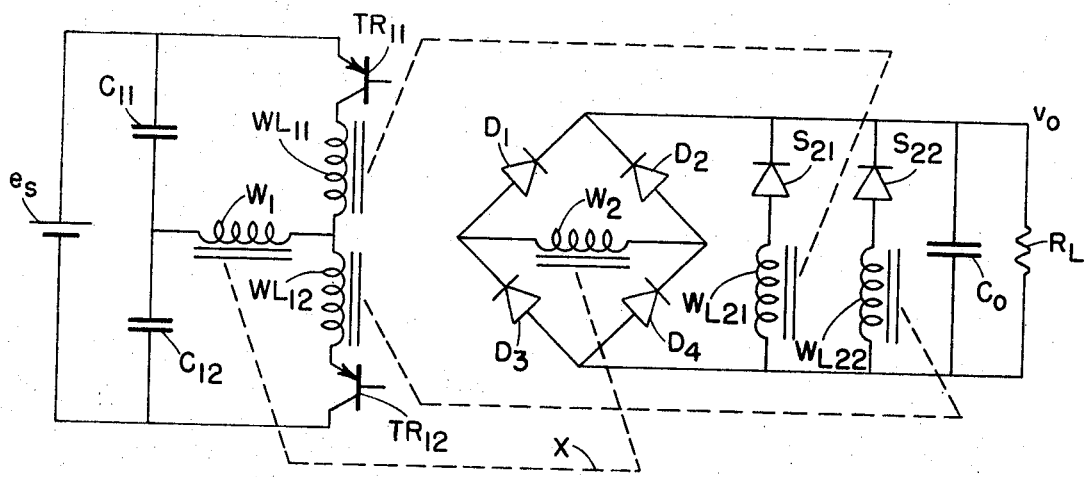
FIG. 20 illustrates the circuit of FIG. 10 wherein transistors are utilized as switches.
Figure 21:
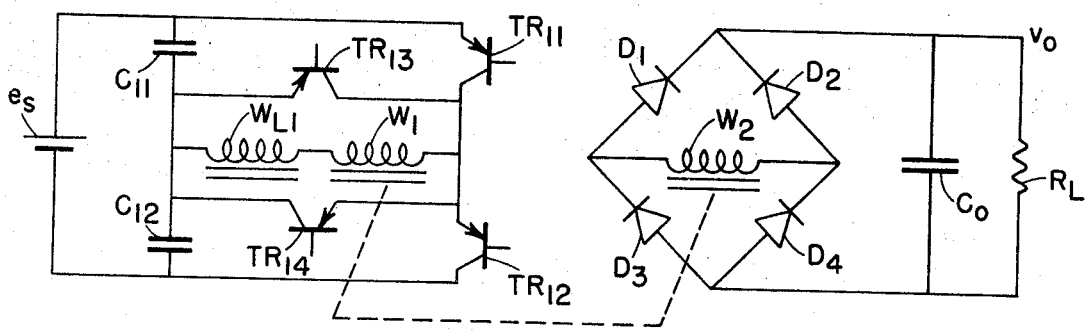
FIG. 21 illustrates the circuit of FIG. 12 wherein transistors are utilized as switches.

Reintroduction of the intrinsic voltage drop in the switching elements $S_{2ij}$ and of the cumulative circuit series resistance $R_{2ij}$ illustrated in FIG. 16, indicates that the voltage $v_{o2}$ will deviate from its nominal value $k_{o2}v_{o2} = v_{o1}$ within certain limits. These limits are determined in conventional manner by the circuit parameter values and the conditions of operation of the common primary circuit of the series inverter. Closer tracking of the individual load voltages is attained when the output voltage of each of the two load circuits is monitored individually by a separate comparator circuit of the type illustrated in FIG. 6, and as shown as comparator 11 and comparator 12 in FIG. 18. The individual load voltage dividers consisting of resistors $R_{al}$ and $R_{bl}$ associated with loads $R_{L1}$ and $R_{L2}$, respectively, are divided such that $h_1v_{o1} = h_2v_{o2}$ and $h_2/h_1 = k_{o2}$. The output signal of the two comparators operate into one common OR gate 29 which in turn energizes the sequencer. The control circuit operates otherwise exactly as discussed with reference to FIG. 6.

Completely independent control of two loads is attained when switches $S_{2ij}$ are controllable, such as implemented by controlled rectifiers, and independent phase angle control is applied during each of the resonant periods. The control mechanism can be implemented for this purpose by application of any known electronic circuit techniques.

Parallel operation of more than two loads follows from an extension of the indicated methods, or modified techniques that implement the present functional philosophies. Parallel operation of two or more loads for amplification of unipolar or bipolar signals is implemented by appropriate extension and application of the functional philosophies that were presented to maintain several stabilized DC output voltages of one converter. Known control mechanisms, other than the type discussed with reference to FIGS. 6 and 18 can be applied for the purpose of control of voltage, current or average power.

Only a relatively small number of circuits and system configurations was presented for purpose of discussion of the underlying principles of this invention. The methods for removal of excess energy from the series inductor(s) were not included in the previous discussions to simplify and amplify the presentation of the significant aspects of the discussed techniques. Their application is, however, tacitly assumed, whereever needed. Known control mechanisms, other than the type discussed with reference to FIGS. 6 and 18 can be applied for the purpose of control of voltage, current, or average power.

As will be understood by those skilled in the art, many other configurations of the invention are possible and can be reduced to equivalent circuits which incorporate the functional philosophies of the invention hereinabove described. These configurations can be summarized in a simple statement: the transfer of energy in discrete quantities via resonant circuits from a source of electric energy to a load, which is shunted by a capacitor which, in turn, is part of the resonant circuit, and the control of this transfer of energy such that the load voltage or current or power waveform becomes a scaled replica of a control signal $e_r(t)$; excess energy that would cause a build-up of excessive potentials in the high Q circuit being recurrently removed from series inductor(s) and returned to the source of electric energy or transferred to the load.

From the foregoing it can be readily appreciated that principles of operation and the technology of a controllable, load insensitive DC transformer in the form of a series capacitor inverter-converter have been formulated and established. The functional philosophy of this network is adapted to the characteristics of current switching operation at high power frequencies in excess of 10 kHz., in order to impose only moderate stresses on the switches and the other circuit elements. Application of these principles leads to the attainment of efficiencies of power transformation in excess of 95 percent since no significant penalties are imposed by the utilization of high power frequencies for purposes of minimization of physical weight and size of apparatus. The time $(T_d)_{min}$ between cessation of current flow in a controlled rectifier and the recovery of its capacity to block the flow of forward current presently limits the frequency of efficient operation of the DC transformer to about 10 kHz.

Construction of equipment with power densities 0.4 kW/kg can be impelemented with currently available silicon controlled rectifiers having a recovery time of 10 $\mu$sec. It is expected that the power density capability will be increased to 1 kW/kg with equal efficiency, when silicon controlled rectifiers having a recovery time of 2 $\mu$sec., currently under development, become available. In addition, this should permit internal frequencies of operation to approximately 50 kHz. Further reduction of the recovery time of controlled rectifiers could be expected in the light of past progress in semiconductor technology.

The network described herein performs voltage scaling and stabilization in one single operation. The first order low-pass filter secures unconditional stability. The zero frequency component of the output impedance "seen" by the load is approximately zero, since the system operates on the principle of a simple regulator. Even in an adverse thermal environment, the output voltage can be maintained within close limits, such as 0.1 percent, by application of electronic volt-seconds integration processes which incorporate autocompensatory techniques against variation of component characteristics due to variation of their operating temperature.

It will be appreciated by those skilled in the art that the above described invention provides converters capable of high efficiencies of electric power conversion since they can readily operate with currently available controlled rectifiers, from relatively high DC or AC voltage sources (up to the order of 1 kilovolt) and because of the zero current conditions that exist at the instants of turn-on and turn-off of the semiconductor $CR_{11}$ and $CR_{12}$. In addition, they are relatively insensitive to widely varying source voltages and a wide range of intended load voltages.

It is therefore further to be understood that the invention may be practiced by those skilled in the art otherwise than as specifically described herein without departing from the spirit and scope of the invention in its broader aspects as defined in the appended claims.

What is claimed is:

1. A controllable, load current insensitive electronic power converter for energizing a load comprising:
   1. a primary section including:
      a. a first source of electric energy;
      b. a first switchable loop capacitively connected to said source of electric energy;
      c. a second switchable loop capacitively connected to said source of electric energy;
      d. a transformer having its primary winding commonly connected in said first and second switchable loops; and,
      e. inductor means commonly connected in said first and second switchable loops; and,
   2. a secondary section including:
      a. a first diode bridge circuit;
      b. the secondary winding of said transformer connected across one pair of opposing terminals of said first diode bridge circuit;
      c. a smoothing filter connected across the other pair of opposing terminals of said first diode bridge circuit;

said load being connected across said other pair of opposing terminals of said first diode bridge circuit; and wherein:

said first switchable loop comprises a first electronic switch, a first inductor, the primary winding of said transformer and a first capacitor, the junction between said first electronic switch and said first capacitor being connected to one side of said first source of electric energy;

said second switchable loop comprises a second electronic switch, a second inductor, said primary winding of said transformer and a second capacitor, the junction between said second electronic switch and said second capacitor being connected to the second side of said first source of electric energy; and, said primary winding of said transformer and said inductors being joined to form a series connection, one terminal of said series connection being connected to both otherwise unconnected terminals of said first and second capacitors, and the second terminal of said series connection being connected to both otherwise unconnected terminals of said first and second electronic switches through said first and second conductors, respectively; and including:

a first secondary winding coupled to said first inductor, said first secondary winding being connected to one terminal of said first diode bridge and connected through a third electronic switch to the other terminal of said first diode bridge; and a second secondary winding coupled to said second inductor, said second secondary winding being connected to one terminal of said first diode bridge, but with opposite polarity to said first secondary winding of said inductor, and connected through a fourth electronic switch to the other terminal of said first diode bridge.

2. A controllable, load insensitive electronic power converter as claimed in claim 1 including:

a resistive voltage divider network connected in parallel with said smoothing filter;

a second source of electric energy;

a comparator connected to said resistive voltage divider network and to said second source of electric energy;

a two output sequencer having its input connected to the output of said comparator;

a first firing pulse generator having its input connected to one output of said sequencer and its output connected to the control terminal of the first of said first and second electronic switches; and, a second firing pulse generator having its input connected to the second output of said sequencer and its output connected to the control terminal of the second of said first and second electronic switches.

3. A controllable, load current insensitive electronic power converter for energizing a load comprising:
   1. a primary section including:
      a. a first source of electric energy;
      b. a first switchable loop capacitively connected to said source of electric energy;
      c. a second switchable loop capacitively connected to said source of electric energy;
      d. a transformer having its primary winding commonly connected in said first and second switchable loops; and,
      e. a first inductor commonly connected in said first and second switchable loops; and,
   2. a secondary section including:
      (a) a first diode bridge circuit;
      (b) the second winding of said transformer connected across one pair of opposing terminals of said first diode bridge circuit;
      (c) a smoothing filter connected across the other pair of opposing terminals of said first diode bridge circuit;

said load being connected across said other pair of opposing terminals of said first diode bridge circuit; and wherein:

said first switchable loop comprises a first electronic switch; said first inductor, the primary winding of said transformer and a first capacitor, the junction between said first electronic switch and said first capacitor being connected to one side of said first source of electric energy;

said second switchable loop comprises a second electronic switch, said first inductor, said primary winding of said transformer and a second capacitor, the junction between said second electronic switch and said second capacitor being connected to the second side of said first source of electric energy; and said primary winding of said transformer and said inductors being joined to form a series connection, one terminal of said series connection being connected to both otherwise unconnected terminals of said first and said second capacitors, and the second terminal of said series connection being connected to both otherwise unconnected terminals of said first and second electronic switches through said first and second conductors, respectively; and including:

a third electronic switch connected in parallel with the series connected first inductor and primary transformer winding; and, a fourth electronic switch also connected in parallel with the series connected first inductor and primary transformer winding.

4. A controllable, load insensitive electronic power converter comprising:
1. a primary section including:
   a. a first source of electric energy;
   b. a first switchable loop capacitively connected to said source of electric energy;
   c. a second switchable loop capacitively connected to said source of electric energy;
   d. a transformer having its primary winding commonly connected in said first and second switchable loops; and,
   e. a first inductor commonly connected in said first and second switchable loops;
2. a secondary section including:
   a. a first diode bridge circuit;
   b. the secondary winding of said transformer connected across one pair of opposing terminals of said first diode bridge circuit; and
   c. a smoothing filter and a load connected in parallel across the other pair of opposing terminals of said first diode bridge circuit;
3. a control section including:
   a. a voltage sensing means connected across the output of said smoothing filter so as to sense the output voltage; and,
   b. control means connected to said voltage sensing means and to said first and second switchable loops for controlling the rate of switching of said switchable loops in accordance with the sensed output voltage; and wherein:

said first switchable loop comprises a first electronic switch, a first inductor, the primary winding of said transformer and a first capacitor, the junction between said first electronic switch and said first capacitor being connected to one side of the first source of electric energy;

said second switchable loop comprises a second electronic switch, said first inductor, said primary winding of said transformer and a second capacitor, the junction between said second electronic switch and said second capacitor being connected to the second side of said first source of electric energy; and, said primary winding of said transformer and said inductor being joined to form a series connection, one terminal of said series connection being connected to both otherwise unconnected terminals of said first and said second capacitors, and the second terminal of said series connection being connected to both otherwise unconnected terminals of said first and second electronic switches; and including:

a third electronic switch connected in parallel with the series connected first inductor and primary winding; and a fourth electronic switch also connected in parallel with the series connected first inductor and primary winding.

5. A controllable, load insensitive electronic power converter as claimed in claim 4 wherein:
1. said voltage sensing means comprises:
   a. a resistive voltage divider network connected in parallel with said smoothing filter;
   b. a second source of control; and,
   c. a comparator connected to said resistive voltage divider network and to said second control voltage; and,
2. said control means comprises:
   a. a two output sequencer having its input connected to the output of said comparator;
   b. a first electronic switch actuating pulse generator having its input connected to one output of said sequencer and its output connected to said first switchable loop; and,
   c. a second electronic switch actuating pulse generator having its input connected to the second output of said sequencer and its output connected to said second switchable loop.

6. A controllable, load insensitive electronic power converter as claimed in claim 4 wherein said electronic switches are all power transistors.

7. A controllable, load insensitive electronic power converter comprising:
1. a primary section including:
   a. a first source of electric energy;
   b. a first switchable loop capacitively connected to said source of electric energy, said first switching loop including a first inductor;
   c. a second switchable loop capacitively connected to said source of electric energy, said second switchable loop including a second inductor; and,
   d. a transformer having its primary winding commonly connected in said first and second switchable loops; and,
2. a secondary section including:
   a. a first diode bridge circuit;
   b. a secondary winding of said transformer connected across one pair of opposing terminals of said first diode bridge circuit; and
   c. a smoothing filter connected across the other pair of opposing terminals of said first diode bridge circuit; and including:

a secondary winding on said first inductor;

a third electronic switch connected in series with said secondary winding on said first inductor across said other pair of opposing terminals of said first diode bridge;

a secondary winding on said second inductor; and, a fourth electronic switch connected in series with said second inductor across said other pair of opposing terminals of said first diode bridge circuit.

8. A controllable, load insensitive electronic power converter as claimed in claim 7 including means to prevent recharging of said smoothing filter capacitor for the duration of its discharge into a pulse forming load network.

9. A controllable, load insensitive electronic power converter as claimed in claim 7 wherein the smoothing filter consists of a capacitor connected across said other pair of opposing terminals of said diode bridge circuit.

10. A controllable, load insensitive electronic power converter as claimed in claim 7 wherein:
   said first switchable loop comprises said first electronic switch, said first inductor, the primary winding of said transformer and a first capacitor, the junction between said first electronic switch and said first capacitor being connected to one side of said first source of electric energy;
   said second switchable loop comprises said second electronic switch, said second inductor, the primary winding of said transformer and a second capacitor, the junction between said second electronic switch and said second capacitor being connected to the second side of the source of electric energy; and,
   said primary winding of said transformer being part of said first and second said switchable loops, one terminal of said primary winding of said transformer being connected to otherwise unconnected terminals of said first and second capacitors, and said primary winding of said transformer being connected to the otherwise unconnected terminal of the series combination of said first electronic switch and first inductor and to the otherwise unconnected terminal of the series combination of said second electronic switch and second inductor.

11. A controllable, load insensitive electronic power converter as claimed in claim 10 wherein said first and second electronic switches are controlled rectifiers and said third and fourth solid state switches are rectifier diodes.

12. A controllable, load insensitive electronic power converter as claimed in claim 11 including:
   a resistive voltage divider network connected in parallel with said smoothing filter;
   a second source of electric energy;
   a comparator connected to said resistive voltage divider network and to said second source of electric energy;
   a two output sequencer having its input connected to the output of said comparator;
   a first firing pulse generator having iits input connected to one output of said sequencer and its output connected to the gate of one of said silicon controlled rectifiers; and,
   a second firing pulse generator having its input connected to the second output of said sequencer and its output connected to the gate of the other of said silicon controlled rectifiers.

13. A controllable load insensitive electronic power converter as claimed in claim 12 wherein:
   said first source of electric energy develops a unipolar voltage at all times; and,
   said second source of electric energy is of constant magnitude.

14. A controllable, load insensitive electronic power converter of unipolar signals as claimed in claim 12 wherein said second source of electric energy is of unipolar voltage and varies with time.

15. A controllable, load insensitive electronic power converter as claimed in claim 12 wherein said first source of energy is a three phase AC source of electric energy which is first rectified by a full wave rectifier bridge.

16. A controllable, load insensitive electronic power converter as claimed in claim 15 wherein said second source of electric energy is of fixed magnitude.

17. A controllable, load insensitive electronic power converter as claimed in claim 15 wherein said second source of electric energy is of unipolar voltage and varies in a predetermined manner with time.

18. A controllable load insensitive electronic power converter as claimed in claim 10 wherein said first and second electronic switches are power transistors, and said third and fourth electronic switches are controlled rectifiers.

* * * * *